(12) United States Patent
Breed

(10) Patent No.: US 7,126,583 B1
(45) Date of Patent: Oct. 24, 2006

(54) INTERACTIVE VEHICLE DISPLAY SYSTEM

(75) Inventor: David S. Breed, Boonton Township, Morris County, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 1033 days.

(21) Appl. No.: 09/645,709

(22) Filed: Aug. 24, 2000

Related U.S. Application Data

(60) Provisional application No. 60/170,973, filed on Dec. 15, 1999.

(51) Int. Cl.
*G09G 5/08* (2006.01)

(52) U.S. Cl. ............................ 345/158; 345/7; 345/173

(58) Field of Classification Search ................ 345/7–9, 345/156, 157, 173, 856, 860, 158; 359/630–632, 359/13

See application file for complete search history.

(56) References Cited

U.S. PATENT DOCUMENTS

| | | | |
|---|---|---|---|
| 4,528,426 A | 7/1985 | Fatovic et al. .......... 179/121 D |
| 4,787,040 A | 11/1988 | Ames et al. ........... 364/424.01 |
| 4,802,227 A | 1/1989 | Elko et al. ..................... 381/92 |
| 4,818,048 A | 4/1989 | Moss .......................... 350/3.7 |
| 4,962,998 A | 10/1990 | Iino ............................ 350/174 |
| 5,061,996 A * | 10/1991 | Schiffman .................... 348/115 |
| 5,216,711 A | 6/1993 | Takagi et al. ................ 379/433 |
| 5,226,076 A | 7/1993 | Baumhauer, Jr. et al. ... 379/388 |
| 5,289,315 A | 2/1994 | Makita et al. ............... 359/634 |
| 5,313,292 A | 5/1994 | Wood et al. ................. 359/13 |
| 5,313,326 A | 5/1994 | Ramsbottom ............... 359/613 |
| 5,329,272 A | 7/1994 | Massarelli et al. .......... 340/461 |
| 5,339,213 A | 8/1994 | O'Callaghan ............... 361/683 |
| 5,349,303 A | 9/1994 | Gerpheide .................. 330/257 |
| 5,374,449 A | 12/1994 | Buhlmann et al. .......... 427/100 |
| 5,376,946 A | 12/1994 | Mikan ......................... 345/157 |
| 5,379,132 A | 1/1995 | Kuwayama et al. .......... 359/13 |
| 5,381,473 A | 1/1995 | Andrea et al. ............... 379/387 |
| 5,398,962 A | 3/1995 | Kropp ......................... 280/731 |
| 5,404,443 A | 4/1995 | Hirata ......................... 395/161 |
| 5,414,439 A | 5/1995 | Groves et al. .................. 345/7 |
| 5,422,812 A | 6/1995 | Knoll et al. ................. 364/449 |
| 5,453,941 A | 9/1995 | Yoshikawa .................. 364/558 |
| 5,473,466 A | 12/1995 | Tanielian et al. ........... 359/282 |
| 5,486,840 A | 1/1996 | Borrego et al. ................. 345/7 |
| 5,518,078 A | 5/1996 | Tsujioka et al. ............. 178/18 |
| 5,519,410 A | 5/1996 | Smalanskas et al. ........... 345/7 |
| 5,526,433 A | 6/1996 | Zakarauskas et al. ......... 381/92 |

(Continued)

FOREIGN PATENT DOCUMENTS

GB 2365831 2/2002

(Continued)

*Primary Examiner*—Kent Chang
(74) *Attorney, Agent, or Firm*—Brian Roffe

(57) ABSTRACT

An interactive display system for a vehicle including a heads up display system for projecting text and/or graphics into a field of view of a forward-facing occupant of the vehicle and an occupant-controllable device enabling the occupant to interact with the heads up display system to change the text and/or graphics projected by the heads up display system or direct another vehicular system to perform an operation. The device may be a touch pad arranged on a steering wheel of the vehicle (possibly over a cover of an airbag module in the steering wheel) or at another location accessible to the occupant of the vehicle. A processor and associated electrical architecture are provided for correlating a location on the touch pad which has been touched by the occupant to the projected text and/or graphics. The device may also be a microphone.

58 Claims, 14 Drawing Sheets

U.S. PATENT DOCUMENTS

| | | | |
|---|---|---|---|
| 5,539,429 A * | 7/1996 | Yano et al. | 345/173 |
| 5,541,372 A | 7/1996 | Baller et al. | 178/20 |
| 5,541,570 A | 7/1996 | McDowell | 338/47 |
| 5,563,354 A | 10/1996 | Kropp | 73/862.473 |
| 5,565,658 A | 10/1996 | Gerpheide et al. | 178/19 |
| 5,576,687 A | 11/1996 | Blank et al. | 340/438 |
| 5,621,457 A * | 4/1997 | Ishiwaka et al. | 348/78 |
| 5,653,462 A | 8/1997 | Breed et al. | 280/735 |
| 5,673,041 A | 9/1997 | Chatigny et al. | 341/22 |
| 5,673,066 A | 9/1997 | Toda et al. | 345/157 |
| 5,686,705 A | 11/1997 | Conroy et al. | 178/19 |
| 5,692,060 A | 11/1997 | Wickstrom | 381/169 |
| 5,694,150 A | 12/1997 | Sigona et al. | 345/145 |
| 5,703,957 A | 12/1997 | McAteer | 381/92 |
| 5,715,319 A | 2/1998 | Chu | 381/26 |
| 5,724,189 A | 3/1998 | Ferrante | 359/634 |
| 5,734,357 A * | 3/1998 | Matsumoto | 345/7 |
| 5,784,036 A | 7/1998 | Higuchi et al. | 345/7 |
| 5,812,332 A | 9/1998 | Freeman | 359/894 |
| 5,829,782 A | 11/1998 | Breed et al. | 280/735 |
| 5,848,172 A | 12/1998 | Allen et al. | 381/356 |
| 5,848,802 A | 12/1998 | Breed et al. | 280/735 |
| 5,859,714 A | 1/1999 | Nakazawa et al. | 359/13 |
| 5,880,411 A | 3/1999 | Gillespie et al. | 178/18.01 |
| 5,917,906 A | 6/1999 | Thonrton | 379/433 |
| 5,920,310 A | 7/1999 | Faggin et al. | 345/173 |
| 5,933,102 A | 8/1999 | Miller et al. | 341/33 |
| 5,942,733 A | 8/1999 | Allen et al. | 178/18.01 |
| 5,943,295 A | 8/1999 | Varga et al. | 367/99 |
| 6,009,355 A * | 12/1999 | Obradovich et al. | 701/1 |
| 6,032,089 A | 2/2000 | Buckley | 701/36 |
| 6,100,811 A | 8/2000 | Hsu et al. | 340/825.31 |
| 6,195,000 B1 * | 2/2001 | Smith et al. | 340/471 |
| 6,215,479 B1 * | 4/2001 | Matsui | 345/173 |
| 6,373,472 B1 * | 4/2002 | Palalau et al. | 345/173 |
| 6,393,133 B1 * | 5/2002 | Breed et al. | 382/100 |
| 6,505,165 B1 * | 1/2003 | Berstis et al. | 705/1 |

FOREIGN PATENT DOCUMENTS

| | | |
|---|---|---|
| WO | 98/37506 | 8/1998 |
| WO | 98/43202 | 10/1998 |

* cited by examiner

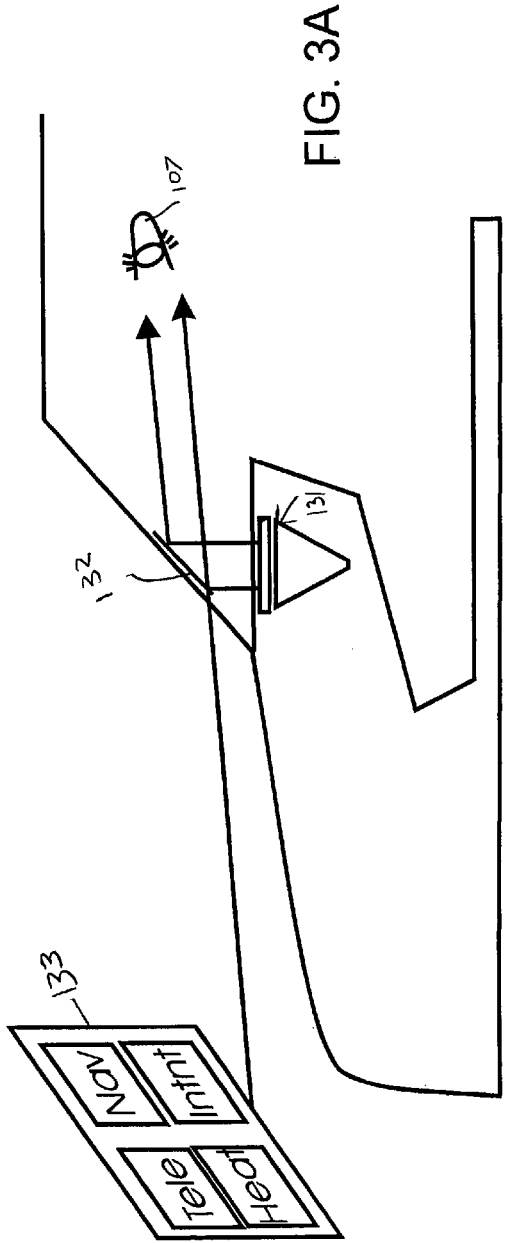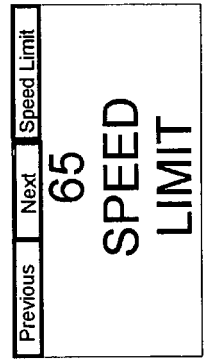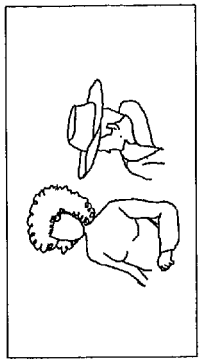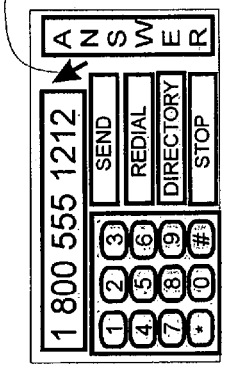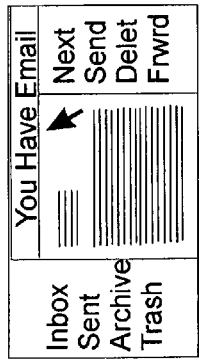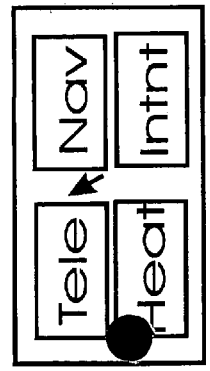

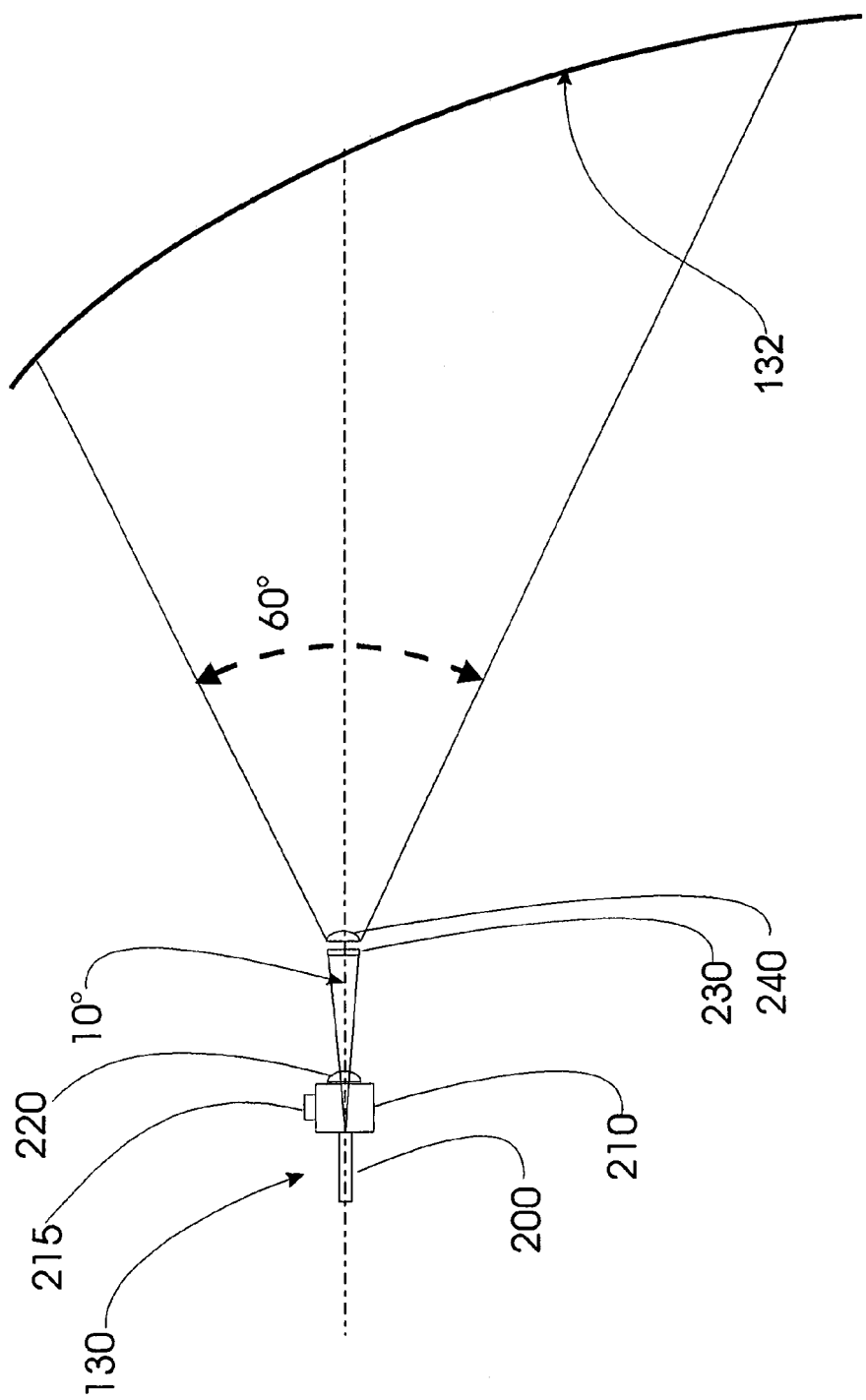

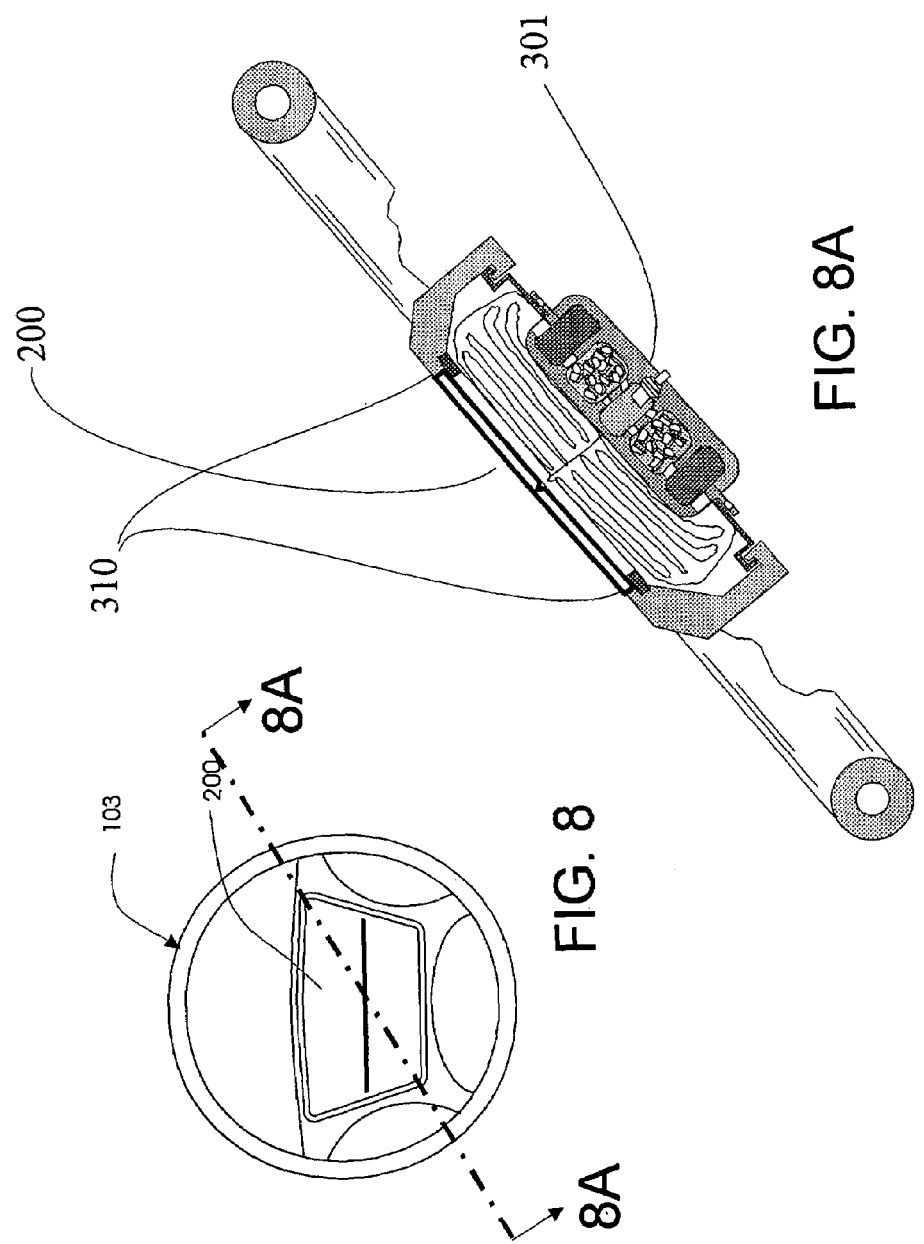

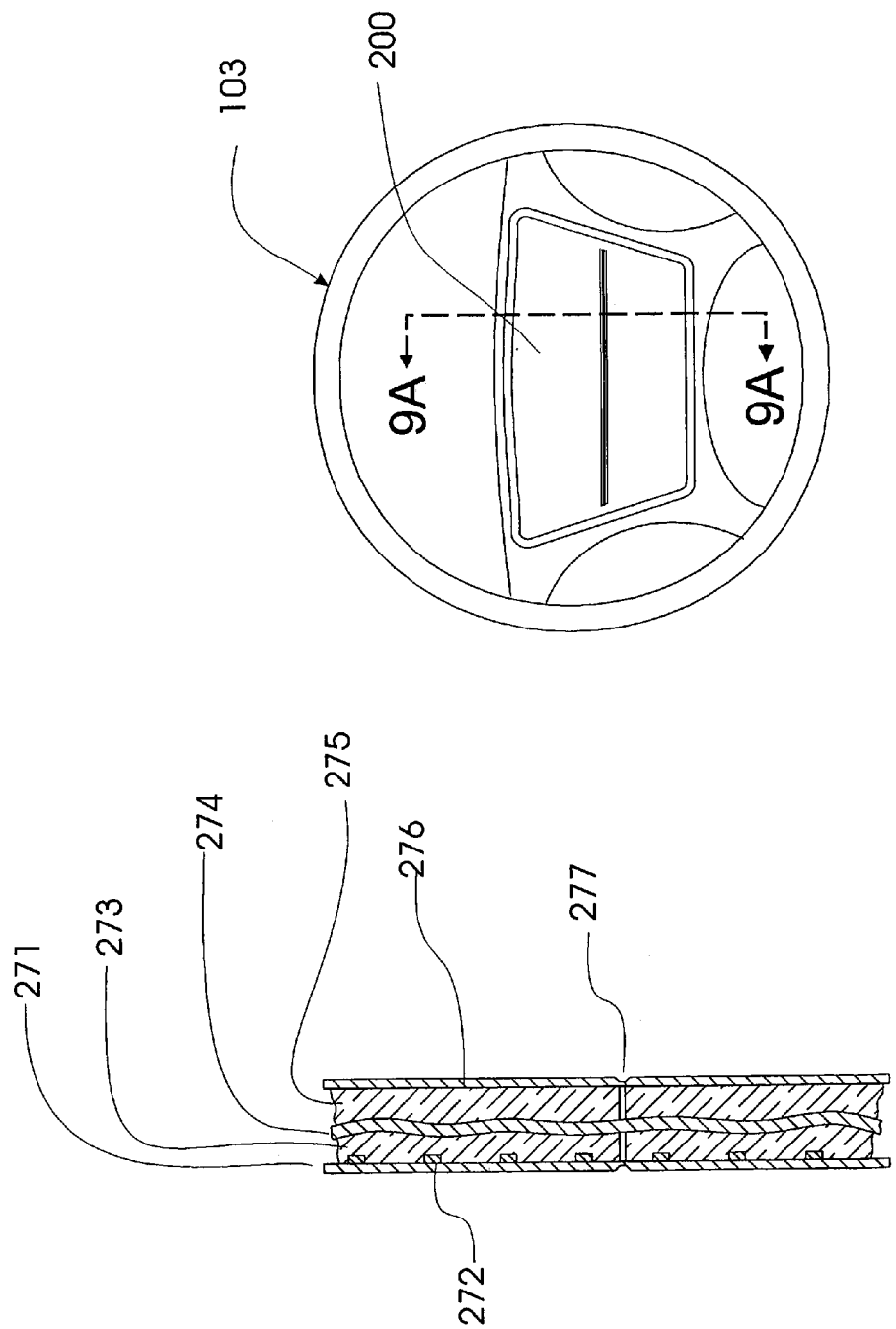

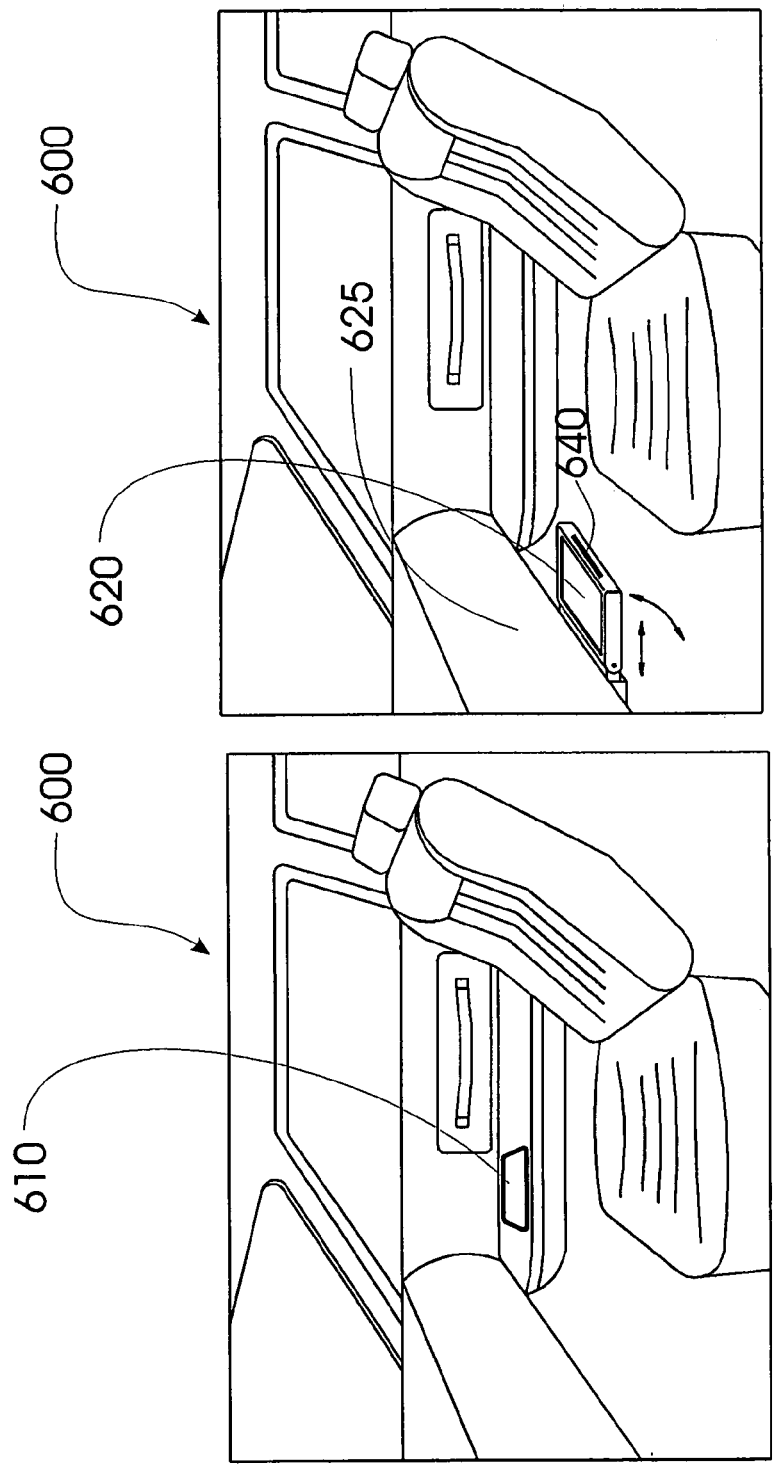

INTERACTIVE VEHICLE DISPLAY SYSTEM

CROSS-REFERENCE TO RELATED APPLICATION

This application claims priority under 35 U.S.C. §119(e) of U.S. provisional patent application Ser. No. 60/170,973 filed Dec. 15, 1999.

FIELD OF THE INVENTION

This invention relates in general to an interactive vehicle display system and in particular, to a heads up display system which is combined with a steering wheel mounted touch pad or voice input system to permit the vehicle operator to operate various apparatus, including a personal computer, without taking his or her eyes off of the road.

BACKGROUND OF THE INVENTION

In an existing heads up display, information is projected onto a specially treated portion of the windshield and reflected into the eyes of the driver. An important component of a head-up display system is known as the combiner. The combiner is positioned forward of the driver and extends partly across his or her view of the real world scene. It is usually either on the interior surface of or laminated inside of the windshield. It is constructed to transmit light from the real world scene ahead of the vehicle and to reflect light information of one or more particular wavelengths propagating from a source within the vehicle. The information is projected onto the combiner using suitable optical elements. The light rays reflected by the combiner are typically collimated to present an image of the information focused at optical infinity permitting the driver to simultaneously view the real world scene and the displayed information without changing eye focus.

Some combiners are simply semi-reflecting mirrors while a particularly effective combiner can be constructed using a hologram or a holographic optical element. In a currently used heads up display in motor vehicles, the motorist views the forward outside real world scene through the windshield. Information pertaining to the operational status of the vehicle is displayed on a heads up display system providing vehicle information, such as fuel supply and vehicle speed, positioned within the motorist's field of view through the windshield thereby permitting the motorist to safely maintain eye contact with the real world scene while simultaneously viewing the display of information. However, such heads up displays are not interactive.

Heads up displays are widely used on airplanes particularly military airplanes. Although many attempts have been made to apply this technology to automobiles, as yet few heads up display systems are on production vehicles. Nevertheless, it is anticipated that more such systems will appear on vehicles in the near future. One reason that heads up displays have not been widely implemented is that vehicle operators have not been willing to pay the cost of such a system merely to permit the operator to visualize his speed or the vehicle temperature, for example, without momentarily taking his eyes from the road. In other words, the service provided by such systems is not perceived to be worth the cost.

There are functions other than viewing the vehicle gages that a driver typically performs that require significantly more attention than a momentary glance at the speedometer. Such functions have heretofore not been considered for the heads up display system. These functions are primarily those functions that are only occasionally performed by the vehicle operator and yet require significant attention. As a result, the vehicle operator must remove his eyes from the road for a significant time period while he performs these other functions creating a potential safety problem. One example of such a function is the adjustment of the vehicle entertainment system. The vehicle entertainment system has become very complex in modern automobiles and it is now very difficult for a vehicle driver to adjust the system for optimum listening pleasure while safely operating the vehicle.

Other similar functions include the adjustment of the heating, ventilation, air conditioning and defrosting system, the dialing and answering of cellular phone calls, as well as other functions which are contemplated for future vehicles such as navigational assistance, Internet access, in-vehicle messaging systems, traffic congestion alerts, weather alerts, etc. Each of these functions, if performed by a driver while operating the vehicle, especially under stressful situations such as driving on congestion highways or in bad weather, contribute an unnecessary risk to the driving process. While a driver is attempting to operate the vehicle in a safe manner, he or she should not be required to remove his or her eyes from the road in order to adjust the radio or make a phone call. Therefore, the purpose of this invention is to minimize this risky behavior by permitting the operator to perform these functions without taking his or her eyes off of the road. As discussed in greater detail below, this is accomplished through the use of a heads up display system combined with a touch pad located, for example, at the center of the steering wheel within easy reach of the driver, or a voice input system.

Prior Art Related to Heads Up Display Systems

There are many patents and much literature that describe the prior art of heads up displays. Among the most significant of the patents are:

U.S. Pat. No. 4,218,111 which describes a lens system for one of the early holographic heads up display units.

U.S. Pat. No. 4,309,070 which describes an aircraft head up display system for pilots.

U.S. Pat. No. 4,613,200 which describes a system for using narrow wavelength bands for the heads up display system. It describes a rather complicated system wherein two sources of information are combined. This patent is believed to be the first patent teaching a heads up display for automobiles.

U.S. Pat. No. 4,711,544 which describes a head up display for an automobile and clearly describes the process by which the focal length of the display is projected out front of the automobile windshield. In this manner, the driver does not have to focus on a display which is close by as, for example, on the instrument panel. Thus, the driver can continue to focus on the road and other traffic while still seeing the heads up display.

U.S. Pat. No. 4,763,990 which describes a method for reducing flare or multiple images resulting in a substantially aberration free display. This is a problem also discussed by several of the other prior art patents.

U.S. Pat. No. 4,787,040 which describes another type display system for automobiles which is not a heads up display. This patent shows the use of "an infrared touch panel or Mylar(™) touch switch matrix mounted over the face of the display".

U.S. Pat. No. 4,787,711 which describes and solves problems of double reflection or binocular parallax that results from conventional heads up displays for use in automobiles.

U.S. Pat. No. 4,790,613 which presents a low-cost heads up display with fixed indicia. The message is fixed but displayed only as needed.

U.S. Pat. No. 4,886,328 which shows a heads up display device and describes a method for preventing damage to the optics of the system caused by sunlight.

U.S. Pat. No. 4,973,132 which describes a polarized holographic heads up display which provides for increased reflectivity and image contrast.

U.S. Pat. No. 5,013,135 which describes a heads up display using Fresnel lenses to reduce the space required for installation of the system.

U.S. Pat. No. 5,157,549 which describes another method of reducing the damage to the heads up display optics by restricting the wavelengths of external light which are reflected into the heads up display optics.

U.S. Pat. No. 5,210,624 which describes a heads up display wherein all light from the environment is allowed to pass through the combiner except light having a frequency equal to the frequency generated by the heads up display. The alleged improvement is to also filter out light from the environment that is of a complementary color to the light from the heads up display.

U.S. Pat. No. 5,212,471 which describes a method for reducing the reflections from the outside windshield surface which produces ghost images.

U.S. Pat. No. 5,229,754 which describes apparatus for increasing the path length of the heads up display using a reflecting plate. This improves the quality of the heads up display while maintaining a compact apparatus design. This added travel of the light rays is needed since in this system the virtual image is located as far in front of the vehicle windshield as the distance from the information source to the heads up display reflector.

U.S. Pat. No. 5,231,379 which describes a method for compensating for the complex aspheric curvature of common windshields. It also provides means of adjusting the vertical location of the reflection off the windshield to suit the size of a particular driver or his preferences.

U.S. Pat. No. 5,243,448 which describes a low-cost heads up display for automobiles.

U.S. Pat. No. 5,289,315 which describes apparatus for displaying a multicolored heads up display. The technique uses two films having different spectral reflectivities.

U.S. Pat. No. 5,313,292 which describes a method for manufacturing a windshield containing a holographic element. This patent presents a good description of a heads-up display unit including mechanisms for reducing the heat load on the LCD array caused by the projection lamp and means for automatically adjusting the intensity of the heads up display so that the contrast ratio between the heads up display and the real world is maintained as a constant.

U.S. Pat. No. 5,313,326 which describes a heads up display and various methods of improving the view to drivers looking at the heads up display from different vertical and lateral positions. The inventor points out that " . . . the affective eye box presented to the driver, i.e. the area within which he will be able to see the image is inherently limited by the effective aperture of the optical projection unit".

The inventor goes on to teach that the eye box should be as large as possible to permit the greatest tolerance of the system to driver height variation, driver head movement, etc. It is also desirable to have a compact optical projection system as possible since available space in the car is limited. There are, however, limitations on the length of the projection unit and the size of the eye box that is achievable.

First, while the use of more powerful optics will permit a shorter physical length unit for a fixed image projection distance, this will give a higher display magnification. The higher the magnification, the smaller the actual display source for a specific image size. Display resolution then becomes a critical factor. A second limitation of optical systems is that for a given eye box a shorter focal length system cannot achieve as good an image quality as a long focal length system.

U.S. Pat. No. 5,329,272, as well as many of the other patents cited above, which describes the use of a heads up display to allow the operator or driver to watch the speedometer, revolution counter, directional indicators, etc. while keeping his or her eyes on the road. This patent is concerned with applying or adapting a large bulky optical system to the vehicle and solves problem by placing the main elements of this optical system in a direction parallel to the transverse axis of the vehicle. This patent also describes a method for adjusting the heads up display based on the height of the driver. It mentions that using the teachings therein that the size of the driver's binocular or eye box is 13 cm horizontal by 7 cm vertical.

U.S. Pat. No. 5,379,132 which attempts to solve the problem of the limited viewing area provided to a driver due to the fact that the size of the driver is not known. A primary object of the invention is to provide a display having an enlarged region of observation. This is done by reducing the image so that more information can be displayed on the heads up display.

U.S. Pat. No. 5,414,439 which states that such heads up displays have been quite small relative to the roadway scene due to the limited space available for the required image source and projection mirrors.

U.S. Pat. No. 5,422,812 which describes an in route vehicle guidance system using a heads up display, but not one that is interactive.

U.S. Pat. No. 5,486,840 which describes a heads up display which purportedly eliminate the effect where sunlight or street lights travel down the path of the heads up display optics and illuminate the projection surface and thereby cause false readings on the heads up display. This problem is solved by using circularly polarized light.

U.S. Pat. No. 5,473,466 describes a miniature high resolution display system for use with heads up displays for installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads up display unit as will be described more detail below.

U.S. Pat. No. 5,812,332 which describes a windshield for a head up display system that reduces the degree of double imaging that occurs when a laminated windshield is used as the combiner in the display system.

U.S. Pat. No. 5,859,714 which describes a method for making the combiner such that a colored heads up display can be created.

Finally, U.S. Pat. No. 5,724,189 which describes methods and apparatus for creating aspheric optical elements for use in a heads up display.

All of the above patents are included herein in their entirety by reference.

Summary of the Heads Up Prior Art:

All of the heads up display units described are for providing an alternate to viewing the gages on the instrument panel or at most the displaying of a map. That is, all are passive systems. Nowhere has it been suggested in the above-mentioned prior art to use the heads up display as a computer screen for interactive use by the vehicle operator where the driver can operate a cursor and/or otherwise interact with the display.

No mention is made in the above-mentioned prior art of the use of a heads up display for: the Internet; making or receiving phone calls; compartment temperature control; control of the entertainment system; active route guidance with input from an external source such as OnStar™; in vehicle signage; safety alerts; weather alerts; traffic and congestion alerts; video conferencing; TV news broadcasts; display of headlines, sports scores or stock market displays; or of switches that can be activated orally or by a touch pad in the center of the steering wheel or elsewhere.

Furthermore, there does not appear to be any examples of where a heads up display is used for more than one purpose, that is, where a variety of different pre-selectable images are displayed.

Background on Touch Pad Technologies

Touch pads are closely related to their "cousins", touch screens. Both use the operator's fingers as the direct link between the operator and the computer. In some cases, a stylus is used but not for the cases to be considered here. In simple cases, touch pads can be used to operate virtual switches and, in more complicated cases, the movement of the operators finger controls a cursor, which can be used to select from a range of very simple to very complicated functions. Several technologies have evolved which will now be described along with some of their advantages and shortcomings.

Capacitive touch pads use the electrical (conductive and dielectric) properties of the user's finger as it makes contact with the surface of the pad. This capacitive technology provides fast response time, durability and a tolerance for contamination. Generally, grease, water and dirt will not interfere with the operation of the capacitive touch pad. Unfortunately, this technology will not work well for steering wheel applications, for example, when the driver is wearing gloves.

Projected capacitive touch pads sense changes in the electrical field adjacent the touch pad. This technology will work with a driver wearing gloves but does not have as high a resolution as the standard capacitive touch pads.

Infrared touch pads contain a grid of light beams across the surface of the pad and check for interruptions in that grid. This system is somewhat sensitive to contamination that can block the transmitters or receivers.

Surface acoustic wave (SAW) touch pads send sound waves across the surface of the touch pad and look for interruptions or damping caused by the operator's fingers. This technology requires the use of a rigid substrate such as glass that could interfere with the operation of the airbag deployment door. It is also affected by contaminants which can also absorb the waves.

Guided acoustic wave technology is similar to SAW except that it sends the waves through the touch pad substrate rather than across the surface. This technology also requires a rigid substrate such as glass. It is additionally affected by contamination such as water condensation.

Force sensing touch pads measure the actual force placed on the pad and is measured where the pad is attached. Typically, strain gages or other force measuring devices are placed in the corners of a rigid pad. This technology is very robust and would be quite applicable to steering wheel type applications, however, it generally has less resolution than the other systems. Force sensing touch pads are either strain gage or platform types. The strain gage touch pad measures the stresses at each corner that a touch to the pad creates. The ratio of the four readings indicates the touch point coordinates. The platform touch pad instead rests on a platform with force measurement sensors at the supports. A touch onto the touch pad translates to forces at the supports.

Resistive touch pads use a flexible resistive membrane, a grid of insulators and a secondary conducting pad to locate the touch point. This pad generally has higher resolution than the force sensing touch pads and is equally applicable to steering wheel type applications. A further advantage is that it can be quite thin and does not generally require a rigid substrate which can interfere with the deployment of the airbag door. Resistive technology touch screens are used in more applications than any other because of the high accuracy fast response and trouble-free performance in a variety of harsh applications.

There are many U.S. patents and other publications that describe touch pad technologies primarily as they relate to inputting data into a computer. Among the significant patents are:

U.S. Pat. No. 4,190,785 which describes a touch pad using a piezoelectric layer. When a finger pressure is placed on the piezoelectric, a voltage is generated. The touch pad actually consists of an array of sensors rather than a continuously varying sensing element. One advantage of the system is that it can be passive. The piezoelectric coating is approximately 0.005 inches thick.

U.S. Pat. No. 4,198,539 which describes a touch pad based on resistance. Through a novel choice of resistors and uniform resistive pad properties, the inventor is able to achieve a uniform electric field in the resistance layer of the touch pad.

U.S. Pat. No. 4,328,441 which describes a "piezoelectric polymer pressure sensor that can be used to form a pressure sensitive matrix keyboard having a plurality of keyboard switch positions arranged in a plurality of rows and columns". The piezoelectric electric polymer film is made from polyvinylidene fluoride. This is only one example of the use of the piezoelectric polymer and some others are referenced in this patent. This touch pad is set up as a series of switches rather than a continuous function.

U.S. Pat. No. 4,448,837 which describes the use of a silicone rubber elastic sheet which has been partially filled with conductive particles of various sizes as part of a resistive touch pad.

U.S. Pat. No. 4,476,463 which describes a touch pad system for use as an overlay on a display that can detect and locate a touch at any location anywhere on the display screen. In other words, it is a continuously variable system. This system is based on a capacitive system using an electrically conductive film overlaying the display screen.

U.S. Pat. No. 4,484,179 which describes a touch sensitive device which is at least partially transparent to light. A flexible membrane is suspended over a CRT display and when pushed against the display it traps light emitted at the contact point by the scanning system. This trapped light can be sensed by edge mounted sensors and the position of the touch determined based on the known position of the scan when the light was detected.

U.S. Pat. No. 4,506,354 which describes an ultrasonic touch pad type device wherein two ultrasonic transducers transmit ultrasound through the air and receive echoes based on the position of a finger on the touch pad.

U.S. Pat. No. 4,516,112 which describes another implementation of a touch pad using a piezoelectric film.

U.S. Pat. No. 4,633,123 which describes another piezoelectric polymer touch screen, in this case used as a keyboard apparatus.

U.S. Pat. Nos. 4,745,301 and 4,765,930 which describe a deformable pressure sensitive electroconductive switch using rubber which is loaded with conductive particles and which could be used in a touch switch or touch pad configuration.

U.S. Pat. No. 4,904,857 which describes a touch screen based on light emitting diodes (LEDs) and receptors wherein light beams are sent parallel to and across the top of the video screen and the interruption of these light beams is sensed.

U.S. Pat. No. 4,963,417 which describes a touch pad consisting of a conductive layer and a layer of deformable insulating particles and a conductive film layer. Pressure on the conductive film layer causes the insulating deformable particles to deform and permits contact between the conductive film and the conductive substrate that can be sensed by resistant measurements.

U.S. Pat. No. 4,964,302 which describes a tactile sensor which can be used by robots for example. The tactile sensor consists of a series of ultrasonic pads and a deformable top layer. When the deformable layer is compressed, the compression can be sensed by the time of flight of the ultrasonic waves by the ultrasonic sensor and therefore both the location of the compression can be determined and the amount compression or force. Such an arrangement is applicable to the touch pads of the current invention as described below. This permits an analog input to be used to control the radio volume, heating or air conditioning temperature, etc.

U.S. Pat. No. 5,008,497 which describes an accurate means for measuring the touch position and pressure on a resistive membrane.

U.S. Pat. No. 5,060,527 which is another example of the tactile sensor that is capable of measuring variable force or pressure. This patent uses an electrically conductive foam as the variable resistance that permits force to be measured.

U.S. Pat. No. 5,159,159 which is another example of a touch pad that is based on resistance and provides the X and Y position of the finger and the pressure at the touch point.

U.S. Pat. No. 5,164,714 which is another system using light emitters and detectors creating a field of light beams going across the surface of the touch pad in both X and Y directions.

U.S. Pat. No. 5,374,449 which describes a monolithic piezoelectric structural element for keyboards which can be used to form discrete switching elements on the pad.

U.S. Pat. No. 5,376,946 which describes a touch screen made of two transparent conductive members which when caused to contract each other change the resistance of the circuit such that, by alternately applying a voltage to the X and Y edges, the location of the touch point can be determined.

A capacitive based touch screen is illustrated in U.S. Pat. No. 5,386,219.

U.S. Pat. No. 5,398,962 which describes a horn activator for steering wheels with airbags. This horn activator switch can be made part of the touch pad as discussed below whereby when the pressure exceeds a certain amount, a horn blows rather than or in addition to activating the heads up display.

U.S. Pat. No. 5,404,443 which describes a CRT display with a touch pad overlay for use in an automobile.

U.S. Pat. No. 5,453,941 which describes a touch pad of the resistive type which also measures pressure as well as location of the touch. This patent uses two separate boards, one for the X coordinate and one for the Y coordinate. A pressure applied against the point located on the X coordinate resistance board causes the X coordinate resistance board to make contact with the Y coordinate resistance board at a point located on the Y coordinate resistance board. The contact is through a contact resistance the magnitude of which is inversely proportional to the pressure applied.

U.S. Pat. No. 5,518,078 which is another example were separate films are used for the X and Y direction. Voltages are selectively applied to the film for measuring the X coordinate and then to the film for measuring the Y coordinate. The pressure of the touch is determined by the contact resistance between the X and Y films.

Most of the prior art devices described above have an analog input, that is, the resistance or capacitance is continuously varying as the pressure point moves across the pad. U.S. Pat. No. 5,521,336, on the other hand, describes a touch pad which provides a digital input device by using sets of parallel strips in one layer orthogonal to another set of parallel strips in another layer. Upon depressing the surface, the particular strips which make contact are determined. These are known as high-density switch closure type touch pad sensors.

U.S. Pat. No. 5,541,372 which describes the use of strain gages to detect deformation of the touch panel itself as result of force being applied. Strain gages are physically integrated with the panel and measure the strain on the panel. An important feature of the invention of this patent is that it measures the deformation of panel itself instead of the deformation of the suspension members of the panel as in the prior art.

U.S. Pat. No. 5,541,570 which describes a force sensing ink that is used in U.S. Pat. No. 5,563,354 to form a thin film force sensors to be used, for example, for horn activation.

U.S. Pat. No. 5,673,041 which describes a reflective mode ultrasonic touch sensitive switch. A touch changes the reflectivity of a surface through which the ultrasound is traveling and changes the impedance of the transducer assembly. This switch can be multiplied to form a sort of digital touch pad. A piezoelectric polymer film is used presumably to maintain the transparency of the switch.

U.S. Pat. No. 5,673,066 which relates to a coordinate input device based on the position of a finger or pen to a personal computer. This patent provides various means for controlling the motion of a cursor based on the motion of a finger and also of providing a reliable switching function when an item has been selected with the cursor. The invention describes the use of touch pressure to indicate the speed with which the cursor should move. A light touch pressure provides for a rapid movement of cursor whereas a strong touch pressure signifies a slow movement. The pressure on the touch pad is determined using four piezoelectric elements for converting pressures to voltages that are arranged on the four corners of the back surface of the rigid plate.

U.S. Pat. No. 5,686,705 which describes a touch pad consisting of a conductive surface containing three electrodes, a compressible insulating layer and a top conductive layer such that when the top conductive layer is depressed it will receive signals from the three electrodes. These signals are transmitted in pairs thereby permitting the location of the contact point on a line bisecting the two electrodes, then by using another pair, a second line can be determined and the intersection of those two lines fixes the point. The determination is based on the level of signal that is inversely proportional to the resistance drop between the contact point in the transmission point.

U.S. Pat. No. 5,917,906 which describes an alternate input system with tactile feedback employing the use of snap domes arranged in the predetermined spaced apart arrangement.

U.S. Pat. No. 5,933,102 which describes an array of capacitive touch switches.

U.S. Pat. No. 5,942,733 which describes a capacitive touch pad sensor capable of being actuated with a stylus input. The consists of a plurality of first parallel conductive traces running in the X direction and a plurality of second parallel conductive traces running in the Y direction. A layer of pressure conductive material is disposed over one of the faces of the substrate which in turn is covered with a protective layer. As the conductive later is moved toward the arrays of substrates the capacitance between the conductive later and each of the substrates is changed which is measurable. A capacitive touch pad has the advantage that it requires much less force than a resistive touch pad. The traces are actually put on both sides of substrate with the X traces going one way and Y traces the other way. An alternative would be to use a flex circuit.

International Patent Publication No. WO98/43202 which describes a button wheel pointing device for use with notebook personal computers.

International Publication No. WO98/37506 reserves various parts of the touch pad for command bar or scroll bar functions.

U.S. Pat. No. 5,374,787 which describes a two-dimensional capacitive sensing system equipped with a separate set of drive and sense electronics for each row and column of the capacitive tablet. The device capacitively senses the presence of the finger and determines its location. This concept is further evolved in U.S. Pat. Nos. 5,841,078, 5,861,583, 5,914,465, 5,920,310 and 5,880,411. U.S. Pat. No. 5,841,078 makes use in one embodiment of a neural network to interpret situations when more than one finger is placed on the touch pad. This allows the operator to use multiple fingers, coordinated gestures etc. for complex interactions. The traces can be placed on a printed circuit board or on a flex circuit. The sensor also measures finger pressure.

U.S. Pat. No. 5,861,583 which provides a two-dimensional capacitive sensing system that cancels out background capacitance effects due to environmental conditions such as moisture Other capacitive prior art U.S. patents include U.S. Pat. Nos. 5,305,017, 5,339,213, 5,349,303 and 5,565,658. These patents also cover associated apparatus for capacitive touch pads sensors.

U.S. Pat. No. 5,565,658 which describes a system that can be used with gloves since the finger need not contact the surface of the touch pad and also describes a technique of making the touch pad using silk screening and a variety of inks, some conducting some non-conducting. The resulting array is both thin and flexible that allows it to be formed into curved surfaces such as required for a steering wheel mounted touch pad.

U.S. Pat. No. 5,940,065 which describes a mapping method of how to compensate for systematic and manufacturing errors which appear in a resistive touch sensor pad.

U.S. Pat. No. 5,694,150 which provides a graphical user interface system to permit multiple users of the same system. Such a system would be applicable when both the driver and passenger are viewing the same output on different heads up or other displays. This could also be useful, for example, when the passenger is acting as the navigator indicating to the driver on the heads up display where he is now and where he should go. Alternately, the navigator could be a remote access operator giving directions to the driver as to how to get to a specific location.

Touch pads that are commercially available include, for example, model TSM946 as supplied by Cirque Corporation and others supplied by the Elo and Synaptics corporations.

A human factors study has shown that the ideal size of the square target for the 95 percentile male population should be about 2.4 cm by 2.4 cm as reported in "A Touch Screen Comparison Study: Examination Of Target Size And Display Type On Accuracy And Response Time" by S. Gregory Michael and Michael E. Miller, Eastman Kodak Co. Rochester, N.Y.

Summary of the Touch Pad Prior Art

As can be appreciated from the sampling of touch pad patents and publications listed above, many technologies and many variations are available for touch pad technology. In particular, most of these designs are applicable for use, for example, as a touch pad mounted in the center of a steering wheel in accordance with the invention, as discussed more fully below. In general, the resolution required for a touch pad for a steering wheel application probably does not have to be as high as the resolution required—for entering drawing or map data to a computer database, for example. A vehicle driver is not going to be able to focus intently on small features of the display. For many cases, a few switch choices is all that will be necessary. This would allow the driver to use the first screen to select among the major function groups that he or she is interested in, which might comprise the entertainment system, navigation system, Internet, telephone, instrument panel cluster, and perhaps one or two additional subsystems. Once he or she selects the system of interest by pressing a virtual button, he or she would then be presented with a new display screen with additional options. If the entertainment system had been chosen, for example, the next series of what choices would include radio, satellite radio, Internet radio, TV, CD, etc. Once the choice among these alternatives has been selected the new screen of button choices would appear.

For other more involved applications, actual control of cursor might be required in much the same way that a mouse is used to control the cursor on a personal computer. In fact, the heads up display coupled with the steering wheel mounted touch pad can in fact be a personal computer display and control device. The particular choice of system components including the heads up display technology and the touch pad technology will therefore depend on the sophistication of the particular system application and the resulting resolution required. Therefore, essentially all of the technologies described in the above referenced prior art touch pad patents are applicable to the invention to be described herein. Therefore, all of the above patents are included herein in their entirety by reference.

Generally, the steering wheel mounted touch pad and heads up display system will result in safer driving for the vehicle operator. This is because many functions that are now performed require the driver to take his or her eyes from the road and focus on some other control system within the vehicle. With the system of this invention, this will not be necessary. On the other hand, the potential exists for adding many more functions, some of which may become very distracting. It is envisioned, therefore, that implementation of the system will be in stages and to a large degree will be concomitant with the evolution of other safety systems such as autonomous vehicles. The first to be adopted systems will likely be relatively simple with low resolution screens and minimum choices per screen. Eventually, full-length movies may someday appear on the heads up display for the entertainment of the vehicle operator while his vehicle is being autonomously guided.

The preferred touch pad technologies of those listed above include capacitance and resistance technologies. Most of the capacitance technologies described require the conductivity of the operator's finger and therefore will not functions if the driver is wearing gloves. Some of the patents have addressed this issue and with some loss of resolution, the standard capacitive systems can be modified to sense through thin driving gloves. For thicker gloves, the projected capacitive systems become necessary with an additional loss of resolution. It is contemplated in the invention described herein, that a combination of these technologies is feasible coupled with a detection system that allows the driver to adjust the sensitivity and thus the resolution of the capacitance system.

Resistance sensitive systems are also applicable and may also require the resolution adjustment system to account for people wearing heavy gloves.

Both the capacitance and resistance systems described in the above patents and publications usually have at least one rigid surface that forms the touch pad base or support. For applications on the center of the steering wheel, provision must be made for the airbag cover to open unimpeded by either the mass or strength of the touch pad. This is a different set of requirements than experienced in any of the prior art. This requires, for example, with the use of the capacitive system, that thin flexible circuits be used in place of rigid printed circuit boards. In the case of the resistive system, thin resistive pressure sensitive inks will generally be used in place of thicker variable resistance pads. Thin metal oxide films on thin plastic films can also be used, however, the durability of this system can be a serious problem.

Force sensing systems also require that the member upon which the force is applied be relatively rigid so that the force is transmitted to the edges of the touch pad where strain gages are located or where the supporting force can be measured. This requirement may also be incompatible with an airbag deployment doors unless the pad is placed wholly on one flap of the deployment door or multiple pads are used each on a single flap.

The use of a thin piezoelectric polymer film, especially in a finger tapping switch actuation mode, is feasible where the electrical resistance of the film can be controlled and where the signal strength resulting from a finger tap can be measured at the four corners of the touch path. Aside from this possible design, and designs using a matrix or tube structure described below, it is unlikely that surface acoustic wave or other ultrasonic systems will be applicable.

It should be noted that the capacitive touch pad is a technology of choice primarily because of its high resolution in the glove-less mode and the fact that it requires a very light touch to activate.

Although the discussion here has concentrated on the use of touch pad technologies, there are other input technologies that may be usable in some particular applications. In particular, in addition to the touch pad, it will be frequently desirable to place a variety of switches at various points outside of the sensitive area of the touch pad. These switches can be used in a general sense such as buttons that are now on a computer mouse, or they could have dedicated functions such as honking of the horn. Additionally functions of the switches can be set based on the screen that is displayed on the heads up display.

For some implementations, a trackball, joystick, button wheel, or other pointing device may be desirable. Thus, although the preferred embodiment of this invention contemplates using a capacitive or resistance touch pad as the input device, all other input devices, including a keyboard, could be used either in conjunction with the touch pad or, in some cases, as a replacement for the touch pad depending on the particular application or desires of the system designer.

Although the primary focus of this invention has been to develop a heads up display and interactive input devices for location on the steering wheel, in many cases it will be desirable to have other input devices of a similar nature located at other places within the vehicle. For example, an input device location for a passenger may be on the instrument panel, the armrest or attached in an extension and retraction arrangement from any surface of the passenger compartment including the seats, floor, instrument panel, headliner and door. In some cases, the device may be removable from a particular storage location and operated as a hand-held device by either the passenger or the driver. The interface thus can be by hard wire or wireless.

Voice recognition systems are now being applied more and more to vehicles. Such systems are frequently trained on the vehicle operator and can recognize a limited vocabulary sufficient to permit the operator to control many functions of the vehicle by using voice commands. These voice systems are not 100% accurate and heretofore there has been no effective means to provide feedback to the operator of the vehicle indicating what the voice system understood. When used with the heads up display interactive system described herein, a voice-input system can be used either separately or in conjunction with the touch pad systems described herein. In this case, for example, the vehicle operator would see displayed on the heads up display the results of voice commands. If the system misinterpreted the driver's command than a correction can be issued and the process repeated. For example, let us say that the vehicle operator gave a command to the vehicle phone system to dial a specific number. Let us assume that the system misunderstood one of the digits of the number. Without feedback, the driver may not know that he had dialed a wrong number. With feedback he would see the number as it is being dialed displayed on the heads up display and if he or she sees that an error occurred, he or she can issue a command to correct the error. In this manner, the interactive heads up display can function along with a voice command data input system as well as the touch pad systems described herein.

The invention disclosed herein can also be used in conjunction with U.S. Pat. No. 5,829,782, which is included herein by reference, which describes, among other things, the use of an occupant location system to find the approximate location of the mouth of a vehicle operator. Once the location of the mouth has been determined, a directional microphone can focus in on that location and thereby significantly improve the accuracy of voice command systems.

In a similar manner also as described in U.S. Pat. No. 5,822,707, which is included herein by reference, the location of the driver's eyes can be approximately determined and either the seat can be adjusted to place the operators eyes into the eye ellipse, which would be the ideal location for viewing a heads up display or, alternately, the heads up display protection system can be adjusted based on the sensed location of the eyes of the occupant. Although several prior art patents have disclosed the capability of adjusting the heads up display, none of them have done so based on a determination of the location of the eyes of the occupant.

One of the problems with heads up displays as described in the prior art patents is that sometimes the intensity of light coming in from the environment makes it difficult to see the information on the heads up display. In U.S. Pat. No. 5,829,782, a filter is disclosed that can be placed between the eyes of the vehicle operator and the source of external light, headlights or sun, and the windshield can be darkened in an area to filter out the offending light. This concept can be carried further when used with a heads up display to darken the area of the windshield where the heads up display is mounted, or even darken the entire windshield, in order to maintain a sufficient contrast ratio between the light coming from the automatically adjusted heads up display optical system and the light coming from the real world scene. This darkening can be accomplished using electrochromic glass or a liquid crystal system.

An alternate method of communicating with a touch pad or other input device is to do so by passive wireless means. In one implementation of this approach in accordance with the invention, a multi-loop cable is placed around the vehicle and used to inductively charge a circuit located on the touch pad or other input device. The device itself can these be totally free of wires since the information that it sends can also be transmitted wireless to the loop, which now acts as an antenna. The device can now be placed anywhere in the vehicle and in fact it can be moved from place to place without concern for wires. This concept is described in another patent application assigned to the same assignee herein and which is included herein in its entirety by reference.

Although the invention described herein is not limited to a particular heads up display technology, the preferred or best mode technology is to use the garnet crystal heads up system described in U.S. Pat. No. 5,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square. Using a laser protection system, a sufficiently large heads up display can be obtained while the system occupies a volume considerably smaller than any system described the prior art. By using a monochromatic laser as the optical source, the energy absorbed by the garnet crystal is kept to a minimum.

These patents are meant to be representative of prior art and not exhaustive. Many other patents that make up the prior art are referenced by the patents reference herein.

All prior art touch systems are active continuously. In the system of this invention, it is contemplated that the heads up display system may only be active or visible when in use. There is no known combination of the prior art that is applicable to this invention.

As the number of functions which the operator must perform while driving the vehicle is increasing, there is a need for a system which will permit the operator to perform various functions related to operating other vehicle systems without requiring him or her to take his or her eyes off of the road.

Such a system will not add undue additional burden to the driver. On the contrary, it will lessen the work load since the driver will not need to take his or her eyes off of the road to control many functions now being performed. On the same basis that people can read road signs while they are driving, people will not have a problem reading messages that are displayed on the heads-up display with the focal point out in front of the vehicle while they are driving, as long as the messages are kept simple. More complicated messages become possible when vehicles are autonomously driven.

OBJECTS AND SUMMARY OF THE INVENTION

This invention is a system that permits the vehicle operator to control various vehicle systems that may be unrelated to the steering and speed control of the vehicle in such a manner that the operator does not need to take his or her eyes off of the road. This is accomplished, in a preferred embodiment, by placing a touch sensitive device in the center portion of the steering wheel that is used in combination with a heads up display system to control various vehicle systems. Generally, the heads up display system will be turned off, that is not visible to the driver, until the driver places his hand on or near the steering wheel mounted touch pad. The action of the driver to place his hand onto the center steering wheel will activate the heads up display device. This device then provides a map of the switch functions or services available on the steering wheel touch pad for the driver. When the driver touches the touch pad with one finger, the location of his touch point may also be illustrated on the heads up display as a cursor. The driver can therefore observe where his or her finger is touching the touch pad and simultaneously what function will be performed if the driver presses the steering wheel pad at that point. Then, through a combination of varying displays which are activated by choices made by the driver and implemented through finger pressure on various portions of the steering wheel mounted touch pad, the driver is able to control various functions of other systems, or select various services, in the vehicle. This invention also contemplates the use of other inputs devices and systems in addition to or in place of a touch pad to control the interactive heads up display. These input devices include voice input, mouse inputs, switch inputs, joy stick inputs and others.

Principle Objects of this Invention are:

1. To provide a system for a vehicle which permits the vehicle operator to operate various vehicle systems without taking his eyes from the road.

2. To permit the vehicle operator to control the vehicle entertainment system through touching various portions of the center of the steering wheel mounted touch pad and to thereby change stations or volume, as well as other functions of the entertainment system.

3. To provide a system to multiplex information created on the steering wheel and transmit that information to a control module either through wire or by wireless transmission.

4. To provide a heads up display system for a vehicle which provides more information to the vehicle driver them heretofore possible and where the nature of the information displayed changes.

5. To provide a heads up display which is only illuminated when it is in use.

6. To provide a heads up display which provides a variety of uses and services and which can be easily changed from one display to another through the use of touch sensitive or other used activated devices.

7. To provide a heads up display for a vehicle which is automatically activated to warn the driver of the vehicle of a potential problem.

8. To provide a heads up display and touch pad or voice input system for a vehicle to permit the vehicle operator to dial a phone number on a cellular phone without taking his eyes from the road.

9. To provide a messaging system for a vehicle which permits the vehicle operator to receive and send messages without taking his eyes from the road.

10. To provide a touch sensitive device mounted on the center of the steering wheel of a vehicle for controlling the contents of the heads up display and for interaction with a personal computer.

11. To provide a heads up display system for a motor vehicle having greater resolution and contrast than heretofore available.

12. To provide a projection system for a heads of display which utilizes a minimum space.

13. To provide a touch sensitive system for a motor vehicle which senses the finger of an occupant to activate a system; senses and displays the location of the finger to determine the selection from a group of alternatives; then senses a force from the finger to register the selection of the occupant.

14. To provide a system for a vehicle which senses the proximity of an occupant's finger to a surface of the vehicle.

15. To provide an ultrasonic system for a vehicle that senses the proximity or a force exerted by the finger of an occupant of the vehicle.

16. To provide a force sensing system for a vehicle that senses the force exerted by the finger of an occupant of the vehicle onto the sensing pad of the system.

17. To provide a capacitive system for a vehicle that senses the proximity or a force exerted by the finger of an occupant of the vehicle.

18. To provide a resistive system for a vehicle that senses the proximity or a force exerted by the finger of an occupant of the vehicle.

19. To provide an interactive heads up display system for a vehicle.

20. To provide a heads up display system for in-vehicle signage.

21. To provide a heads up display system for a vehicle to be used in conjunction with assisted route guidance from an external operator.

22. To provide an interactive heads up display system with a multi-user capability.

23. To provide a heads up display system capable of displaying television.

24. To provide an interactive heads up display system with internet capability.

25. To provide a directional voice canceling microphone system to allow accurate voice inputs to the system.

26. To provide an apparatus and method for locating the eyes of the occupant of a vehicle and adjusting the occupant's seat to place the occupant's eyes at the proper location for viewing a heads up display.

27. To provide an apparatus and method for locating the mouth of the occupant and adjusting the occupant's seat to place the occupant's mouth at the proper location for operating a directional microphone.

28. To provide an apparatus and method for locating the eyes of the occupant and adjusting a heads up display to place the occupant's eyes at the proper location for viewing the heads up display.

29. To provide an apparatus and method for locating the mouth of the occupant and adjusting a directional microphone to place the occupant's mouth at the proper location for operating the directional microphone.

Accordingly, to achieve some of these objects, an interactive display system for a vehicle in accordance with a basic embodiment of the invention comprises projecting means for projecting text and/or graphics into a field of view of a forward-facing occupant of the vehicle, i.e., a heads up display system, and interacting means coupled to the projecting means for enabling the occupant to interact with the projecting means to change the text and/or graphics projected by the projecting means or direct another vehicular system to perform an operation. The interacting means may comprise a touch pad arranged on a steering wheel of the vehicle (possibly over a cover of an airbag module in the steering wheel) or at another location accessible to the occupant of the vehicle, e.g., on the armrest or extendible from below or within the instrument panel. Correlation means are provided, e.g., a processor and associated electrical architecture, for correlating a location on the touch pad which has been touched by the occupant to the projected text and/or graphics and causing the projecting means to change the projected text and/or graphics based on the location on the touch pad which has been touched by the occupant. Also, the vehicular system can be caused to perform the operation based on the location on the touch pad that has been touched by the occupant. Alternately, the occupant can move the curser to a location on the display and then push a switch or tap on the touch pad surface to indicate his or her choice. The interacting means may also comprise a microphone, joystick or any other known device which converts motion by an occupant or a part of an occupant, e.g., arm, mouth (which provides speech), eye, into an electrical signal.

Possible vehicular systems, among others, which can be operated by the combination of the projecting means and interacting means therewith include a communication system, navigation system, entertainment system, a microprocessor capable of providing e-mail functions and Internet access, and a heating and air-conditioning system.

The vehicle can also include determining means for determining a desired location of the eyes of the occupant relative to the projected text and/or graphics (possibly via a determination of the position of the occupant's head and then using tables to approximate the location of the eyes) and adjustment means coupled to a seat of the vehicle on which the occupant is situated for adjusting the seat based on the determined desired location of the eyes of the occupant to thereby move the occupant and thus the occupant's eyes and enable the occupant's view of the projected text and/or graphics to be improved. The determining means may comprise at least one receiver for receiving waves from a space above a seat in the vehicle in which the occupant is likely to be situated and for example, pattern recognition means for determining the position of the occupant based on the waves received by the receiver(s) in order to enable the desired position of the eyes of the occupant to be determined from the position of the occupant. The determining means can also include one or more transmitters for transmitting waves into the space above a seat in the vehicle which are then received by the receiver(s) after passing at least partially through the space above the seat.

Instead of adjusting the seat, the projecting means can be adjusted based on the desired location of the occupant's eyes relative to the text and/or graphics. That is, adjustment means are coupled to the projecting means for adjusting the projecting means based on the determined desired location of the eyes of the occupant relative to the projected text and/or graphics to thereby enable the occupant's view of the projected text and/or graphics to be improved.

The invention also encompasses a vehicle including the above-described determining means, adjustment means and projecting means with the interacting means being an optional modification. In this case, the projecting means and/or seat would be adjusted to ensure that the eyes of the occupant are in the eye-ellipse and thereby provide optimum viewing of the text and/or graphics projected by the projecting means.

Instead of or in addition to a touch pad, the interacting means may comprise a microphone. To optimize the reception of the voice of the occupant by the microphone, the vehicle can include determining means for determining a probable location of the mouth of the occupant, and adjustment means for adjusting the sensitive direction of the microphone to aim the microphone toward the probable location of the mouth of the occupant. Instead of adjusting the microphone, the vehicle can include adjustment means for adjusting a seat on which the occupant is situated to decrease the difference between the sensitive direction of said microphone and the probable location of the mouth of the occupant.

The invention also encompasses a vehicle including the above-described determining means, adjustment means and projecting means with the interacting means being an optional modification. In this case, the projecting means and/or seat would be adjusted to ensure that the mouth of the occupant is positioned optimally relative to the sensitive direction of the microphone to thereby provide optimum reception of the occupant's voice by the microphone.

BRIEF DESCRIPTION OF THE DRAWINGS

The foregoing and other features and advantages of the present invention will become apparent to one skilled in the art to which the invention relates upon consideration of the following detailed description of the invention with reference to the accompanying drawings wherein:

FIG. 3A is a view of a heads up display shown on a windshield but seen by a driver projected in front of the windshield;

FIGS. 3B–G show various representative interactive displays that can be projected on to the heads up display;

FIG. 4 is a diagram of advantages of small heads up display projection screen such as described in U.S. Pat. No. 5,473,466;

FIG. 8 is a front view of a force sensitive touch pad arranged in connection with a steering wheel;

FIG. 8A is a cross sectional view of the steering wheel shown in FIG. 8 taken along the line 8A–8A of FIG. 8;

FIG. 9 is a front view of a capacitance touch pad arranged in connection with a steering wheel;

FIG. 9A is part of a cross sectional view of the steering wheel shown in FIG. 9 taken along the line 9A—9A of FIG. 9;

FIG. 11A and FIG. 11B show other interior surfaces where touch pads can be placed such as on the armrest (FIG. 11A) or projecting out of the instrument panel (FIG. 11B);

DETAILED DESCRIPTION OF THE PREFERRED EMBODIMENTS

Figure 1:
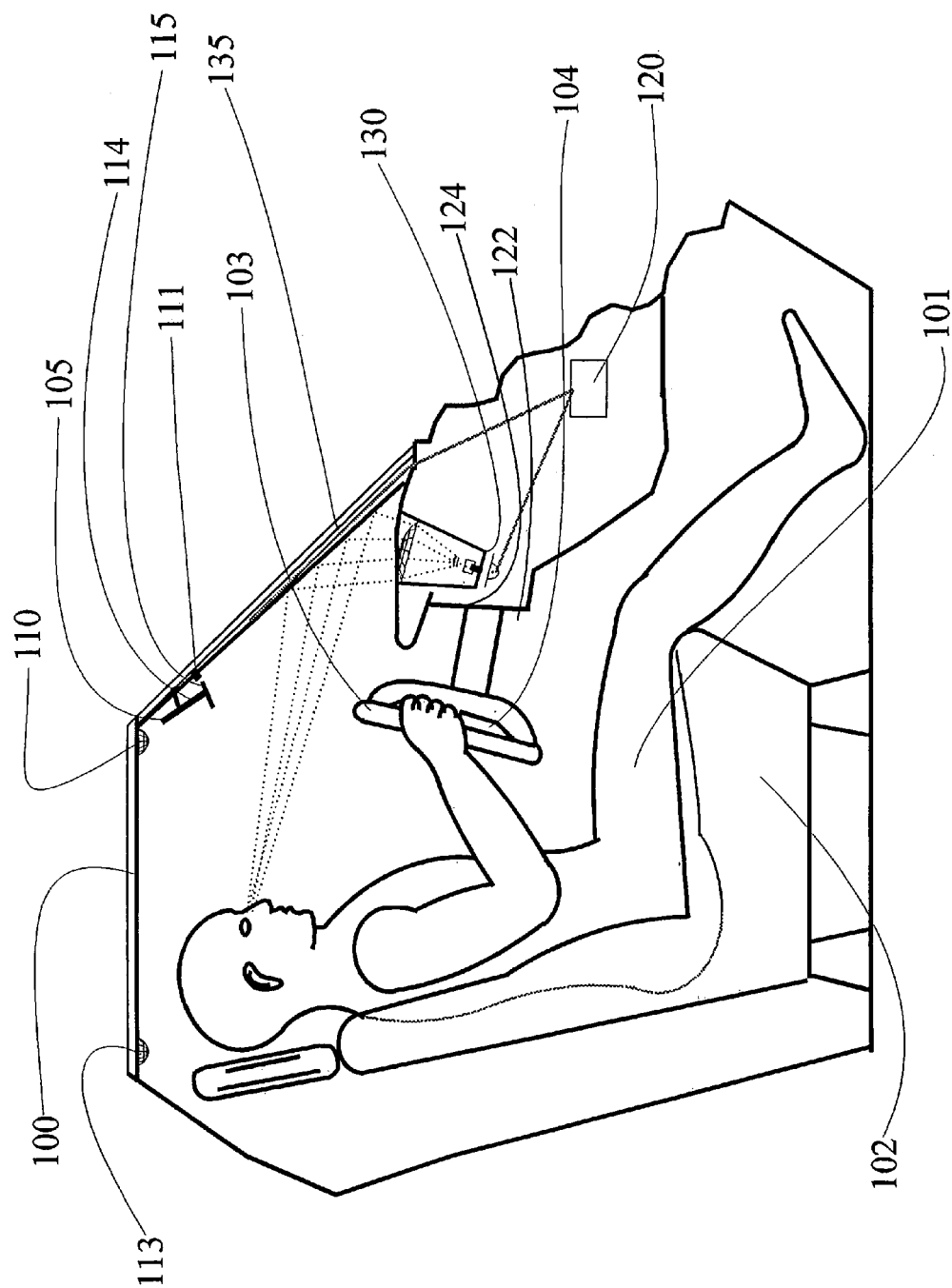
FIG. 1 is a cross section view of a vehicle with heads up display and steering wheel having a touch pad.

Referring now to the drawings wherein like reference numerals refer to the same or similar elements, a section of the passenger compartment of an automobile is shown generally as 100 in FIG. 1. A driver 101 of the automobile sits on a seat 102 behind a steering wheel 103 that contains an airbag assembly 104 with a touch pad data entry device, not shown. A heads up display (HUD) 130 is positioned in connection with instrument panel 124 and reflects off of windshield 135. Three transmitter and/or receiver assemblies (transducers) 110, 111, and 113 are positioned at various places in the passenger compartment to determine the height and location of the head of the driver relative to the heads up display 130. Only three such transducers are illustrated in FIG. 1. In general, four such transducers are used, however, in some implementations as few as two and as many as six are used for a particular vehicle seat.

FIG. 1 illustrates several of the possible locations of such occupant position devices. For example, transmitter and receiver 110 emits ultrasonic or infrared waves which illuminate the head of the driver. In the case of ultrasonic transducers, periodically a burst of ultrasonic waves at about 50 kilohertz is emitted by the transmitter of the transducer and then the echo, or reflected signal, is detected by the receiver of the same transducer (or a receiver of a different device). An associated electronic circuit measures the time between the transmission and the reception of the ultrasonic waves and thereby determines the distance in the Z direction from the transducer to the driver based on the velocity of sound. In the case when an infrared system is used, the receiver is a CCD, CMOS or similar device and measures the position of the occupant's head in the X and Y directions. The X, Y and Z directions making up an orthogonal coordinate system with Z lying along the axis of the transducer and X and Y lying in the plane of the front surface of the transducer. It is contemplated that devices which use any part of the electromagnetic spectrum can be used to locate the head of an occupant and herein a CCD will be defined as any device that is capable of converting electromagnetic energy of any frequency, including infrared, ultraviolet, visible, radar, and lower frequency radiation capacitive devices, into an electrical signal having information concerning the location of an object within the passenger compartment of a vehicle.

The information form the transducers is then sent to an electronics control module that determines if the eyes of the driver are positioned at or near to the eye ellipse for proper viewing of the HUD 130. If not, either the display 130 is adjusted or the position of the driver is adjusted to better position the eyes of the driver relative to the HUD 130, as described in more detail below. Although a driver system has been illustrated, a system for the passenger would be identical for those installations where a passenger HUD is provided. The details of the operation of the occupant position system can be found in U.S. Pat. Nos. 5,653,462, 5,829,782, 5,845,000, 5,822,707, 5,748,473, 5,835,613, 5,943,295, and 5,848,802 among others all of which are included herein by reference.

In addition to determining the location of the eyes of the driver, his or her mouth can also be simultaneously found. This permits, as described more detail below, the adjustment of a directional microphone to facilitate accurate voice input to the system.

Electromagnetic or ultrasonic energy can be transmitted in three modes in determining the position of the head of an occupant. In most of the cases disclosed in the above referenced patents, it is assumed that the energy will be transmitted in a broad diverging beam which interacts with a substantial portion of the occupant. This method has the disadvantage that it will reflect first off the nearest object and, especially if that object is close to the transmitter, it may mask the true position of the occupant. Generally, reflections from multiple points are used and this is the preferred ultrasonic implementation. The second mode uses several narrow beams that are aimed in different directions toward the occupant from a position sufficiently away from the occupant that interference is unlikely. A single receptor can be used providing the beams are either cycled on at different times or are of different frequencies. However, multiple receptors are in general used to eliminate the effects of signal blockage by newspapers etc. Another approach is to use a single beam emanating from a location that has an unimpeded view of the occupant such as the windshield header or headliner. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant. In this manner, an image of the occupant can be obtained using a single receptor and pattern recognition software can be used to locate the head, chest, eyes and/or mouth of the occupant. The beam approach is most applicable to electromagnetic energy but high frequency ultrasound can also be formed into a beam. The above referenced patents provide a more complete description of this technology.

The windshield header as used herein includes the space above the front windshield including the first few inches of the roof. The headliner is the roof interior cover that extends back from the header.

Each of these methods of transmission or reception could be used, for example, at any of the preferred mounting locations shown in FIG. 1.

Directional microphone 115 is mounted onto mirror assembly 114 or at another convenient location. The sensitive direction of the microphone 115 can also be controlled by the occupant head location system so that, for voice data input to the system, the microphone 115 is aimed in the approximate direction of the mouth of the driver. A description of various technologies that are used in constructing directional microphones can be found in U.S. Pat. Nos. 4,528,426, 4,802,227, 5,216,711, 5,381,473, 5,226,076, 5,526,433, 5,673,325, 5,692,060, 5,703,957, 5,715,319, 5,825,898 and 5,848,172 which are all included herein by reference. A preferred design will be discussed in detail below.

Figure 2:
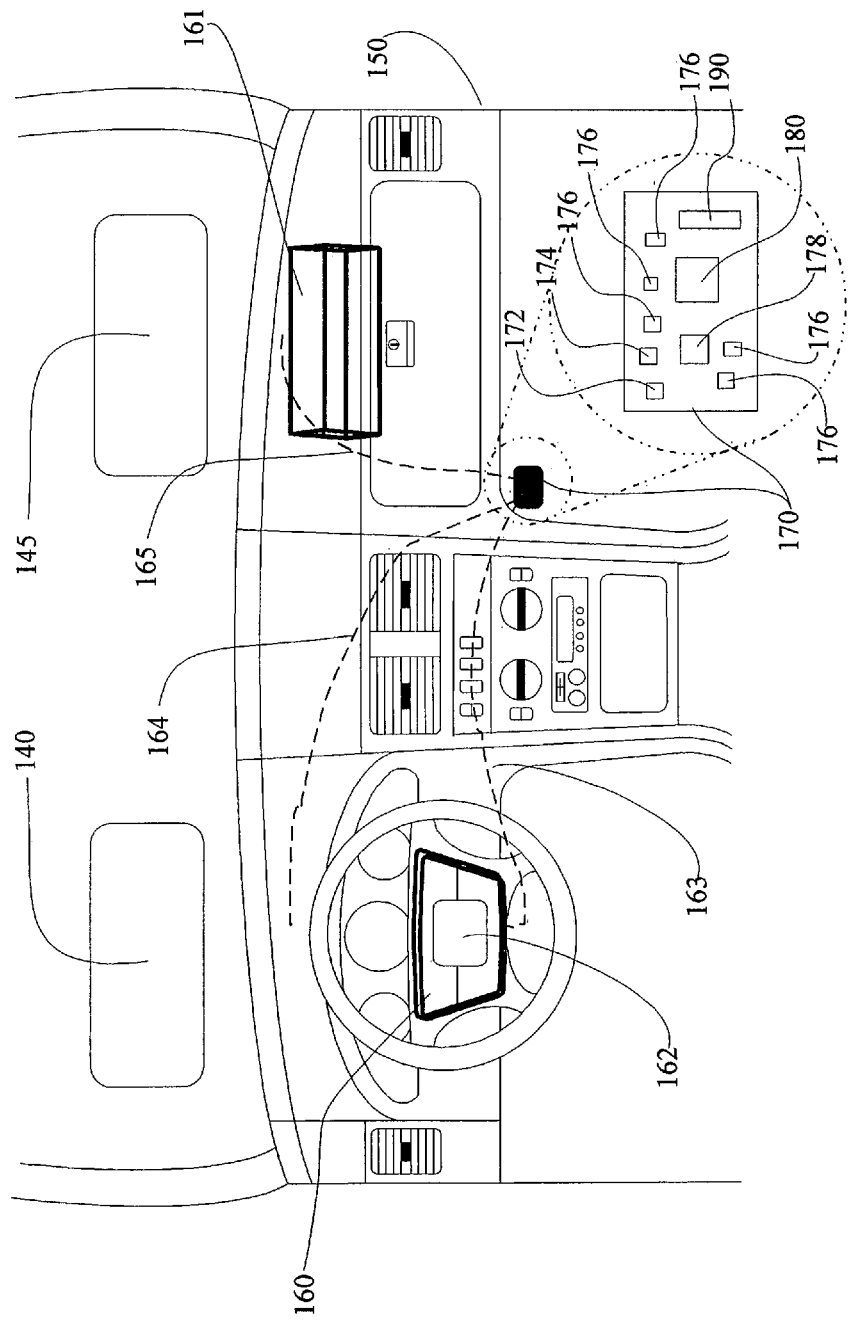
FIG. 2 is a view of the front of a passenger compartment of an automobile with portions cut away and removed showing driver and passenger heads up displays and a steering wheel mounted touch pad.

FIG. 2 is a view of the front of a passenger compartment 150 of an automobile with portions cut away and removed, having dual airbags 160, 161 and an electronic control module 170 containing a HUD control system comprising various electronic circuit components shown generally as 172, 174, 176, 178 and microprocessor 180. The exact selection of the circuit components depends on the particular technology chosen and functions performed by the occupant sensor and HUDs 140,145. Wires 164 and 165 lead from the control module 170 to the HUD projection units, not shown, which projects the information onto the HUDs 140 and 145 for the driver and passenger, respectively. Wire 163 connects a touch pad 162 located on the driver steering wheel to the control module 170. A similar wire and touch pad are provided for the passenger but are not illustrated in FIG. 2.

The microprocessor 180 may include determining means for determining the location of the head of the driver and/or passenger for the purpose of adjusting the seat to position either occupant so that his or her eyes are in the eye ellipse or to adjust the HUD 140,145 for optimal viewing by the occupant, whether the driver or passenger. The determining means would use information from the occupant position sensors such as 110, 111, 113 or other information such as the position of the vehicle seat and seat back. The particular technology used to determine the location of an occupant and particularly of his or her head is preferably based on neural networks or neural fuzzy systems, although other probabilistic, computational intelligence or deterministic systems can be used, including, for example, pattern recognition techniques based on sensor fusion. For the case where a neural network is used, the electronic circuit may comprise a neural network processor. Other components on the circuit include analog to digital converters, display driving circuits, etc.

FIG. 3A is a view of a heads up display shown on a windshield but seen by a driver projected in front of the windshield and FIGS. 3B–G show various representative interactive displays that can be projected onto the heads up display.

The heads up display projection system 130 projects light through a lens system 131 through holographic combiner or screen 132, which also provides columniation, which reflects the light into the eyes 107 of driver 101. The focal point of the display makes it appear that it is located in front of the vehicle at 133.

The informational content viewed by the driver at 133 can take on the variety of different forms examples of which are shown in FIGS. 3B–3G. Naturally, many other displays and types of displays can be projected onto the holographic screen 132 in addition to those shown in FIGS. 3B–3G. Naturally the displays that are generally on the instrument panel such as the fuel and oil levels, engine temperature, battery condition, the status of seatbelts, doors, brakes, lights, high beams, and turn signals as well as fuel economy, distance traveled, average speed, distance to empty, etc. can be optionally displayed. Other conventional HUD examples include exception messages such as shut off engine, overheating, etc.

FIG. 3B illustrates the simplest of the types of displays that are contemplated by this invention. In this display, the driver can select between the telephone system (Tele), heating system (Heat), navigation system (Nav) or Internet (Intnt). This selection can be made by either pressing the appropriate section of the touch pad or by using a finger to move the cursor to where it is pointing to one of the selections (see FIG. 3B), then by tapping on the touch pad at any location or by pushing a dedicated button at the side of the touch pad, or at some other convenient location. Alternately, a voice input can be used to select among the four options. The operation of the voice system will be described in more detail below. If the voice system is chosen, then the cursor may automatically move to the chosen selection and a momentary highlighting of the selection can take place indicating to the operator what function was chosen.

For this elementary application of the heads up display, a choice of one of the buttons may then result in a new display having additional options. If the heating option is chosen, for example, a new screen perhaps having four new buttons would appear. These buttons could represent the desired temperature, desired fan level, the front window defrost and the rear window defrost. The temperature button could be divided into two halves one for increasing the temperature and the other half for decreasing the temperature. Similarly, the fan button can be set so that one side increases the fan speed and the other side decreases it. Similar options can also be available for the defrost button. Once again the operator could merely push at the proper point on the touch pad or could move the cursor to the proper point and tap anywhere on the touch pad. For the case where a continuous function is provided, for example, the temperature of the vehicle, each tap could represent one degree increase or decrease the temperature.

A more sophisticated application is shown in FIG. 3C where the operator is presented with a touch pad for dialing phone numbers after he or she has selected the telephone (Tele) from the first screen. The operator can either depress the numbers to the dial a phone number, in which case the keypad or touch pad may be pre-textured to provide a tactile feel for where the buttons are located, or the driver can orally enunciated the numbers. In either case, as the numbers are selected they would appear in the top portion of the display. Once the operator is satisfied that the number is correct, then he or she can push SEND to initiate the call. If the line is busy, a push of the STOP button stops the call and later a push of the REDIAL button can reinitiate the call. Naturally, an automatic redial feature can also be included. A directory feature is also provided in this example permitting the operator to dial a number by selecting or saying a rapid-dial code number or by a mode such as the first name of the person. Depressing the directory button, or by saying "directory", would allow the directory to appear on the screen.

In congested traffic, bad weather, or other poor visibility conditions, a driver, especially in an unknown area, may fail to observe important road signs along the side of the road. Also, such signs may be so infrequent that the driver may not remember what the speed limit is on a particular road, for example. Additionally, emergency situations can arise where the driver should be alerted to the situation such as "icy road ahead", "accident ahead", "construction zone ahead", etc. There have been many proposals by the Intelligent Transportation Systems community to provide signs on the sides of roads that automatically transmit information to a car equipped with the appropriate reception equipment. In other cases, a vehicle which is equipped with a route guidance system would have certain unchanging information available from the in-vehicle map database. For cases where the driver missed reading a particular sign, the capability can exist for the driver to review previous sign displays (see FIG. 3D). Similarly, for those cases where the driver wants to become aware of approaching signs, he or she can view the contents of signs ahead providing that information is in the route guidance database within the vehicle. This system permits the vehicle operator to observe signs with much greater flexibility, and without concern of whether a truck is blocking the view of signs on a heads up display that can be observed without interfering with the driver's ability to drive the vehicle.

FIG. 3E is a more sophisticated application of the system. In this case, the driver desires route guidance information which can be provided in many forms. In this case, a map of the area where the driver is driving appears on the heads up display along with various options such as zoom-in (+) and zoom-out (−). With the map at his ready view, the driver can direct himself following the map and, if the vehicle has a GPS system or preferably a differential GPS system, he can watch his progress displayed on the map as he drives. For those cases where the driver needs assistance, he or she can activate the assistance button which will notify an operator, such as an OnStar™ operator, and send the vehicle location as well as the map information to the operator. The operator then can have the capability of taking control of the map being displayed to the driver and indicate on that map the route that the driver is to take to get to his or her desired destination. The operator could also have the capability of momentarily displaying pictures of key landmarks that the driver should look for and additionally be able to warn the driver of any approaching turns, construction zones, etc. Naturally, there are route guidance programs that can perform some of these functions and it is anticipated that in general these programs would be used in conjunction with the heads up display map system. For those drivers who prefer the assistance of an individual, the capability described above can be provided.

Naturally, all of the commands that are provided with the cursor movement and buttons that would be entered through the touch pad can also be entered as voice commands. In this case, the selections could be highlighted momentarily so that the operator has the choice of canceling the command before it is executed. Another mouse pad or voice input can then cause the new email to be read aloud to the vehicle occupant. The heads up display thus gives valuable feedback to the voice system again without necessitating the driver to look away from the road.

If the Internet option was chosen, the vehicle operator would have a virtually unlimited number of choices as to what functions to perform as he surfs the Internet. One example is shown in FIG. 3F where the operator has been informed that he has email. It is possible, for example, to have as one of the interrupt display functions on the heads up display at all times, an indicator that an email has arrived. Thus, for example, if the driver was driving without the heads up display activated, the receipt of the email could cause activation of the heads up display and a small message indicating to the driver that he or she had received email. This is an example of a situation interrupt. Other such examples include the emergency in-vehicle signage described above.

Once the operator has selected email as an option, he or she would then have the typical choices available on the Internet email programs. Some of these options are shown on the display in FIG. 3F. There may be concern that drivers should not be reading email while driving a vehicle. On the other hand, drivers have no problem reading signs as they drive down the highway including large numbers of advertisements. If the email is properly formatted so that it is easy to read, a normal driver should have no problem reading email any more than reading billboards as he or she operates the vehicle in a safe manner. He or she can even respond to an email message by orally dictating an answer into a speech to text program.

In the future when vehicles are autonomously guided, a vehicle operator may wish to watch his favorite television show or a movie while the trip is progressing. This is shown generally in FIG. 3G.

The above are just a few examples of the incredible capability that becomes available to the vehicle operator, and also to a vehicle passenger, through the use of an interactive heads up display along with a device to permit interaction with heads up display. The interactive device can be a touch pad as described above or similar device or a voice input system that will be described in more detail below.

Naturally, many other capabilities and displays can be provided a few of which will now be discussed. In vehicle television reception was discussed above which could come from either satellite transmissions or through the Internet. Similarly, video conferencing becomes a distinct possibility in which case a miniature camera would be added to the system. Route guidance can be facilitated by various levels of photographs which depict local scenes as seen from the road. Additionally, tourist spots can be highlighted with pictures that are nearby as the driver proceeds down the highway. The driver could have the capability of choosing whether or not he or she wishes to hear or see a description of upcoming tourist attractions.

Various functions that enhance vehicle safety can also make use of the heads up display. These include, for example, images of objects which occupy the blind spots which can by supplemented by warning messages should the driver attempt to change lanes when the blind spot is occupied. Many types of collision warning aids can be provided including images which are enhanced along with projected trajectories of vehicles on a potential collision path with the current vehicle. Warnings can be displayed based on vehicle-mounted radar systems, for example those which are used with intelligent cruise control systems, when the vehicle is approaching another vehicle at too high a velocity. Additionally, when passive infrared sensors are available, images of animals that may have strayed onto the highway in front of the vehicle can be projected on the heads up display along with warning messages. In more sophisticated implementations of the system, as described above, the position of the eyes of the occupant will be known and therefore the image of such animals or other objects which can be sensed by the vehicle's radar or infrared sensors, can be projected in the proper size and at the proper location on the heads up display so that the object appears to the driver approximately where it is located on the highway ahead. This capability is not possible without an accurate knowledge of the location of the eyes of the driver.

In U.S. Pat. No. 5,845,000, and other related patents, cross referenced above on occupant sensing, the detection of a drowsy or otherwise impaired or incapacitated driver is discussed. If such a system detects that the driver may be in such a condition, the heads up display can be used to test the reaction time of the driver by displaying a message such as "Touch the touch pad". If the driver fails to respond within a predetermined time, a warning signal can be sounded and the vehicle slowly brought to a stop with the hazard lights flashing. Additionally, the cellular phone can be used to summon assistance.

There are a variety of other services that can be enhanced with the heads up display coupled with the data input systems described herein. These include for example the ability using either the touch pad or the voice input system to command a garage door to be opened. Similarly, lights in a house can be commanded either orally or through the touch pad to be turned on or off as the driver approaches or leaves the house. When the driver operates multiple computer systems, one at his or her house, another in the automobile, and perhaps a third at a vacation home or office, upon approaching one of these installations, the heads up display can interrogate the computer at the new location, perhaps through Bluetooth™ to determine which computer has the latest files. Naturally, a system of this type would be under some kind of security system that could be based on a recognition of the driver's voice, for example. A file transfer would be initiated then either orally or through the touch pad prior to the driver leaving the vehicle that would synchronize the computer at the newly arrived location with the computer in the vehicle. In this manner, as the driver travels from location to location, wherever he or she visits as long as the location has a compatible computer, the files on the computers can all the automatically synchronized.

There are many ways that the information entered into the touch pad can be transmitted to the in-vehicle control system or in-vehicle computer. All such methods including multiple wire, multiplex signals on a single wire pair, infrared or radio frequency are contemplated by this invention. Similarly, it is contemplated that this information system will be part of a vehicle data bus that connects many different vehicle systems into a single communication system.

In the discussion above, it has been assumed that the touch pad would be located on the steering wheel, at least for the driver, and that the heads up display would show the functions of the steering wheel touch pad areas, which could be switches, for example. With the heads up display and touch pad technology it is also now possible to put touch pads at other locations in the vehicle and still have their functions display on the heads up display. For example, areas of the perimeter of steering wheel could be designed to act as touch pads or as switches and those switches can be displayed on the heads up display and the functions of those switches can be dynamically assigned. Therefore, for some applications, it would be possible to have the few switches on the periphery of steering and the functions of those switches could be changed depending upon the display of the heads up display and of course the switches themselves can be used to change contents of that display. Through this type of a system, the total number of switches in the vehicle can be dramatically reduced since a few switches can now perform many functions. Similarly, if for some reason one of the switches becomes inoperable, another switch can be reassigned to execute the functions that were executed by the inoperable switch. Furthermore, since the touch pad technology is relatively simple and unobtrusive, practically any surface in the vehicle can be turned into a touch pad. In the extreme, many if not most of the surfaces of the interior of the vehicle could become switches as a sort of active skin for the passenger compartment. In this manner, the operator could choose at will where he would like the touch pad to be located and could assign different functions to that touch pad and thereby totally customize the interior of the passenger compartment of the vehicle to the particular sensing needs of the individual. This could be especially useful for people with disabilities.

The communication of the touch pad with the control systems in general can take place using wires. As mentioned above, however, other technologies such as wireless technologies using infrared or radio frequency can also be used to transmit information from the touch pad to the control module (both the touch pad and control module thereby including a wireless transmission/reception unit which is known in the art). In the extreme, the touch pad can in fact be a totally passive device that receives its energy to operate from a radio frequency or other power transmission method from an antenna within the automobile. In this manner, touch pads can be located at many locations in the vehicle without necessitating wires. If a touch pad were energized for the armrest, for example, the armrest can have an antenna that operates very much like an RFID tag system as described in copending U.S. Patent application number (ATI-209) which is included herein by reference. It would receive sufficient power from the radio waves broadcast within the vehicle, or by some other wireless method, to energize the circuits, charge a capacitor and power the retransmission of the code represented by pressing the touch pad switch back to the control module. In some cases, a multi-loop cable can be placed so that it encircles the vehicle and used to activate many wireless input devices such as tire gages, occupant seat weight sensors, seat position sensors, temperature sensors, switches etc. In the most advanced cases, the loop can even provide power to motors that run the door locks and seats, for example. In this case an energy storage device such as a rechargeable battery or ultra-capacitor would, in general, be associated with each device.

When wireless transmission technologies are used, many protocols exist for such information transmission systems with Bluetooth as a preferred example. The transmission of information can be at a single frequency in which case, it could be frequency modulated or amplitude modulated, or a could be through a pulse system using very wide spread spectrum technology or any other technology between these two extremes.

In the case where multiple individuals are operators of the same vehicle, it may be necessary to have some kind of password or security system such that the vehicle computer system knows or recognizes the operator. The occupant sensing system, especially if it uses electromagnetic radiation near the optical part of spectrum, can probably be taught recognize the particular operators of the vehicle. Alternately, a simple measurement of morphological characteristics such as weight, height, and one or two other such characteristics, could be used to identify the operator. Alternately, the operator can orally enunciate the password for use the touch pad to enter a password. More conventional systems such as a coded ignition key could serve the same purpose. By whatever means, once the occupant is positively identified, then all of the normal features that accompany a personal computer can become available such as bookmarks or favorites for operation of the Internet and personalized phonebooks, calendars, agendas etc. Then, by the computer synchronization system described above, all computers used by a particular individual can contain the same data. Updating one has the effect of updating them all. One could even imagine that progressive hotels would have a system to offer the option to synchronize a PC in a guest's room to the one in his or her vehicle.

The preferred heads up projection system will now be described. This system is partially described in U.S. Pat. Nos. 5,473,466 and 5,051,738. A schematic of a preferred small heads up display projection system 130 is shown in FIG. 4. A light source such as a high-power monochromatic coherent laser is shown at 200. Output from this laser 200 is passed through a crystal 210 of a material having a high index of refraction such as the acoustic-optical material paratellurite. An ultrasonic material 215 such as lithium niobate is attached to two sides of the paratellurite crystal, or alternately two in series crystals. When the lithium niobate is caused to vibrate, the ultrasonic waves are introduced into the paratellurite causing the laser beam to be diffracted. With a properly chosen set of materials, the laser beam can be caused to diffract by as much as about 3 to 4 degrees in two dimensions. The light from the paratellurite crystal then enters lens 220 which expands the scanning angle to typically 10 degrees where it is used to illuminate a 1 cm square garnet crystal 230. The garnet crystal contains the display to be projected onto the heads up display as described in the aforementioned patents that are included herein by reference. The laser light modulated by the garnet crystal 230 now enters lens 240 where the scanning angle is increased to 60 degrees. The resulting light travels to the windshield 135 that contains a layer of holographic and collimating material 132 that has the property that it totally reflects the monochromatic laser light while passing light of all other frequencies. The light thus reflects off the holographic material into the eyes of the driver 101.

The intensity of light emitted by light source 200 can be changed by manually adjustment using a brightness control knob, not shown, or can be set automatically to maintain a fixed display contrast ratio between the display brightness and the outside world brightness independent of ambient brightness. The automatic adjustment of the display contrast ratio is accomplished by an ambient light sensors, not shown, whose output current is proportional to the ambient light intensity. Appropriate electronic circuitry is used to convert the sensor output to control the light source 200. In addition, in some cases it may be necessary to control the amount of light passing through the combiner, or the windshield for that matter, to maintain the proper contrast ratio. This can be accomplished through the use of electrochromic glass or a liquid crystal filter, both of which have the capability of reducing the transmission of light through the windshield either generally or at specific locations. Another technology that is similar to liquid crystals is "smart glass" manufactured by Frontier Industries.

Naturally, corrections must be made for optical aberrations resulting from the complex aspheric windshield curvature and to adjust for the different distances that the light rays travel from the projection system to the combiner so that the observer sees a distortion free image. Methods and apparatus for accomplishing these functions are described in the patents cross referenced above. Thus, a suitable optical assembly can be designed in accordance with conventional techniques by those having ordinary skill in the art.

Most of the heads up display systems described in the prior art patents can be used with the invention described herein. The particular heads up display system illustrated in FIG. 4 has advantages when applied to automobiles. First, the design has no moving parts such as rotating mirrors, to create the laser scanning pattern. Secondly, it is considerably smaller and more compact then all other heads up display systems making it particularly applicable for automobile instrument panel installation where space is at a premium. The garnet crystal 230 and all other parts of the optics are not significantly affected by heat and therefore sunlight which happens to impinge on the garnet crystal 230, for example, will not damage it. Naturally, a filter (not shown) can be placed over the entire system to eliminate all light except that of the laser frequency. The garnet crystal display system has a further advantage that when the power is turned off, the display remains. Thus, when the power is turned on the next time the vehicle is started, the display will be in the same state as it was when the vehicle was stopped and the ignition turned off.

U.S. Pat. No. 5,414,439 states that conventional heads up displays have been quite small relative to the roadway scene due to the limited space available for the required image source and projection mirrors. The use of the garnet crystal display as described herein permits a substantial increase in the image size solving a major problem of previous designs.

Figure 5:
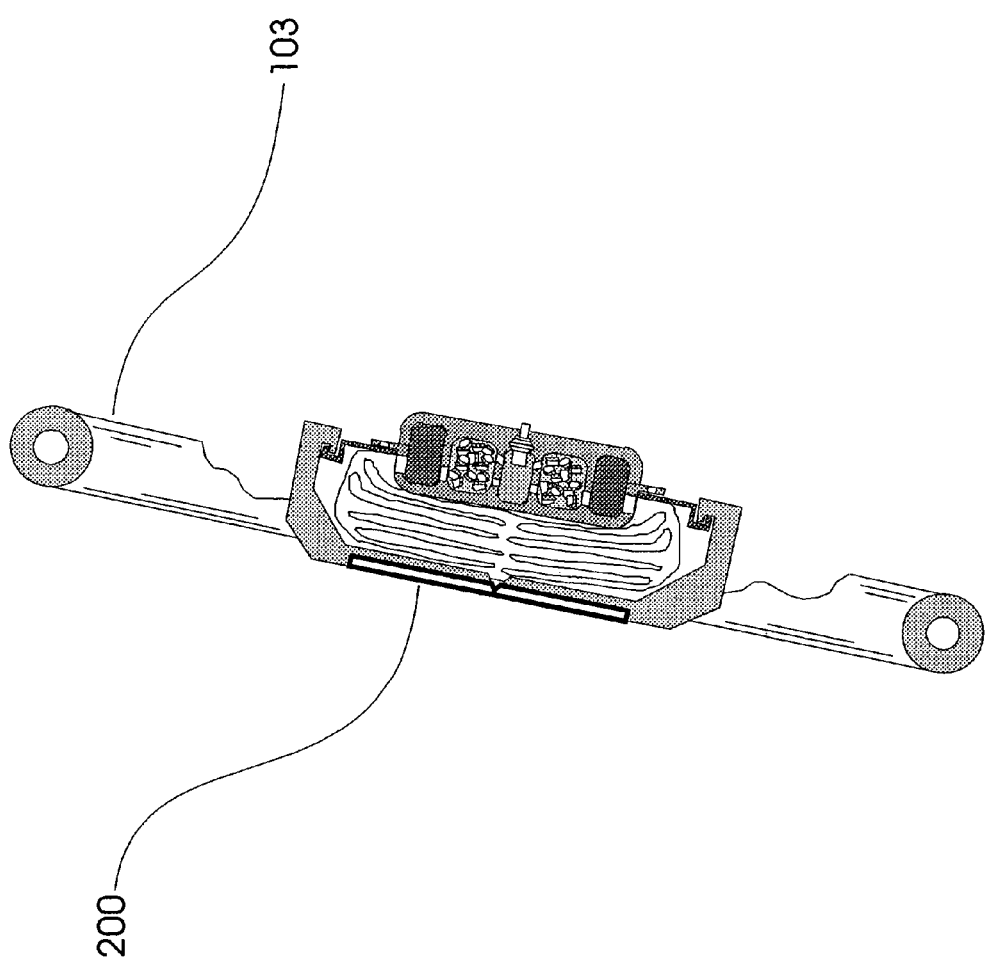
FIG. 5 is a cross section view of an airbag-equipped steering wheel showing a touch pad.

An airbag-equipped steering wheel 103 containing a touch pad 200 according to the teachings of this invention is shown in FIG. 5. A variety of different touch pad technologies will now be described.

Figure 6:
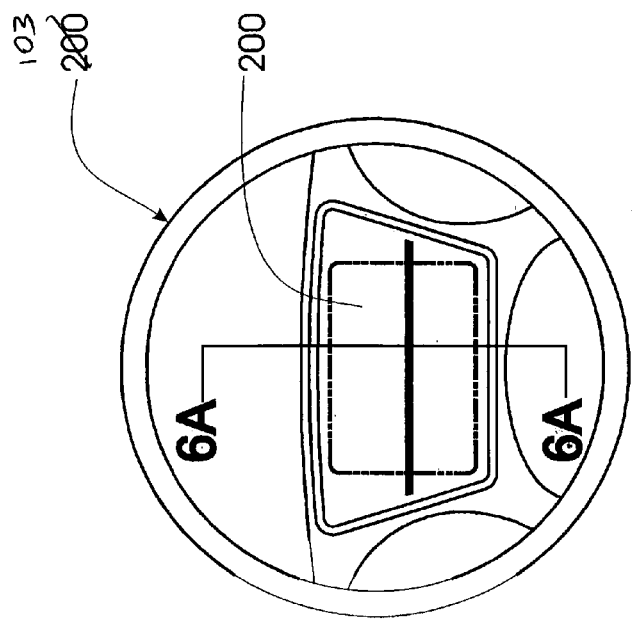
FIG. 6 is a front view of a steering wheel having a touch pad arranged in connection therewith.
Figure 6A:
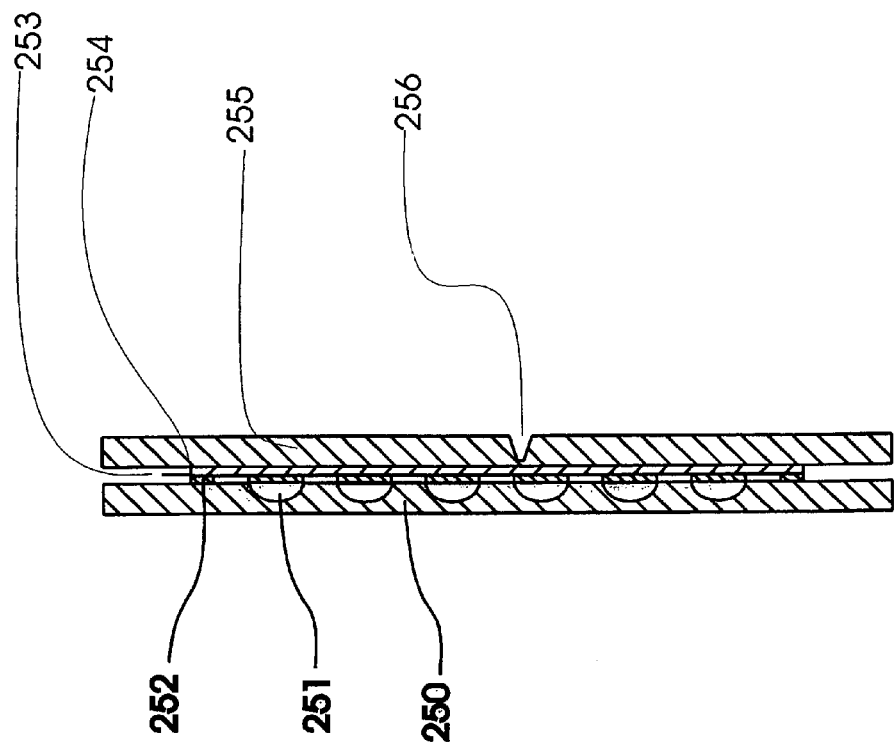
FIG. 6A is a cross sectional view of the steering wheel shown in FIG. 6 taken along the line 6A–6A of FIG. 6.

A touch pad based on the principle of reflection of ultrasonic waves is shown in FIG. 6 where once again the steering wheel is represented by reference numeral 103 and the touch pad in general is represented by reference numeral 200. In FIG. 6A, a cross-section of the touch pad is illustrated. The touch pad 200 comprises a semi rigid material 250 having acoustic cavities 251 and a film of polyvinylidene fluoride 253 containing conductors, i.e., strips of conductive material with one set of strips 252 running in one direction on one side of the film 253 and the other set of strips 254 running in an orthogonal direction on the opposite side of the film 253. A foam 255 is attached to the film 253. When a voltage difference is applied across the film 253 by applying a voltage drop across an orthogonal pair of conductors, the area of the film 253 where the conductors 252,254 cross is energized. If a 100 kHz signal is applied across that piece of film, it is caused to vibrate at 100 kHz emitting ultrasound into the foam 255. If the film 253 is depressed by a finger, for example, the time of flight of the ultrasound in the foam 255 changes which also causes the impedance of the film 253 to change at that location. This impedance change can be measured across the two exciting terminals and the fact that the foam 255 was depressed can thereby be determined. A similar touch pad geometry is described in U.S. Pat. No. 4,964,302, which is included in here by reference. The basic principles of operation of such a touch pad are described in detail in that patent and therefore will not be repeated here. FIG. 6A also shows a portion of the film and conductive strips of the touch pad including the film 253 and conductive strips 252 and 254. The film 253 s optionally intentionally mechanically weakened at 256 to facilitate opening during the deployment of the airbag.

Figure 7:
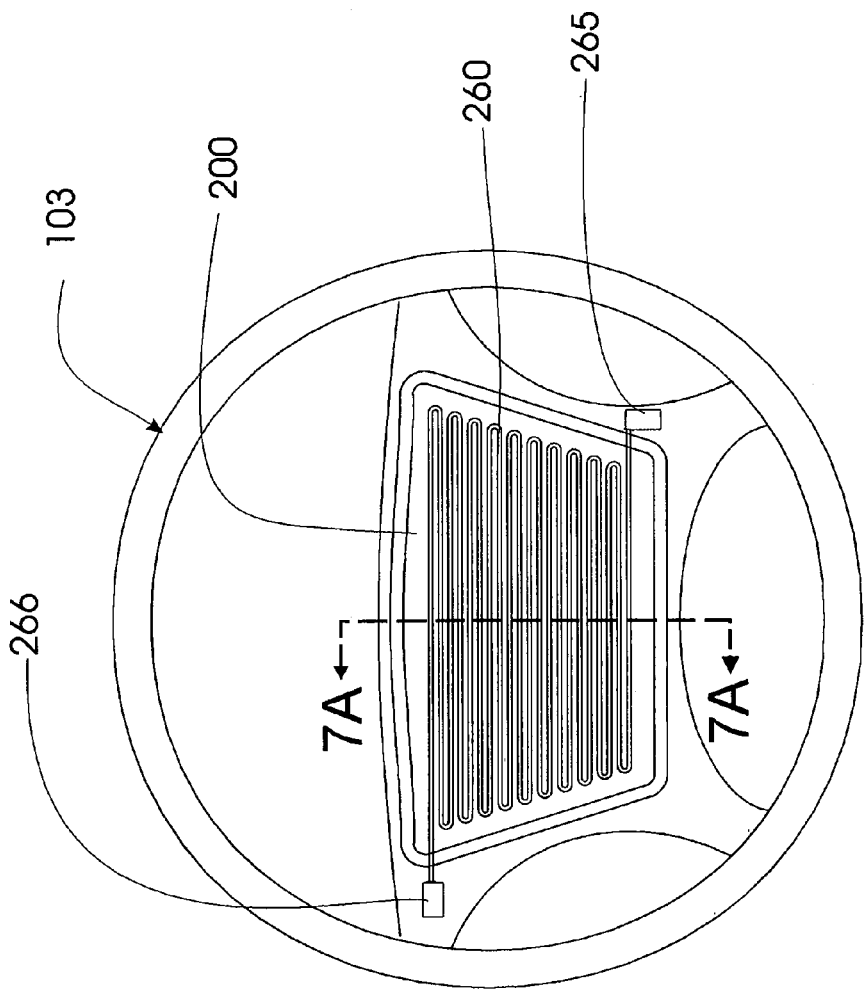
FIG. 7 is a front view of an ultrasound-in-a-tube touch pad arranged in connection with a steering wheel.
Figure 7A:
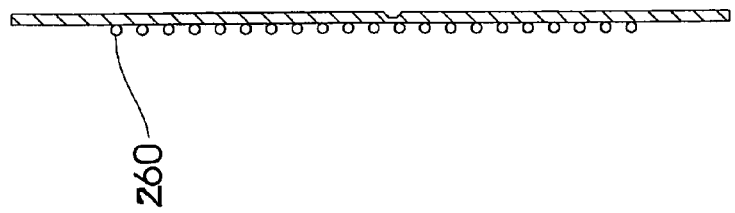
FIG. 7A is a cross sectional view of the steering wheel shown in FIG. 7 taken along the line 7A–7A of FIG. 7.

Another touch pad design based on ultrasound in a tube as disclosed in U.S. Pat. No. 5,629,681, which is included herein by reference, is shown generally at 200 in the center of steering wheel 103 in FIG. 7. In FIG. 7, the cover of the touch pad 200 has been removed to permit a view of the serpentine tube 260. The tube 260 is manufactured from rubber or another elastomeric material. The tube 260 typically has an internal diameter between about ⅛ and about ¼ inches. Two ultrasonic transducers 265 and 266 are placed at the ends of the tube 260 such as Murata 40 kHz transducer part number MA40S4R/S. Periodically and alternately, each transducer 265,266 will send a few cycles of ultrasound down the tube 260 to be received by the other transducer if the tube 260 is not blocked. If a driver places a finger on the touch pad 200 and depresses the cover sufficiently to began collapsing one or more of the tubes 260, the receiving transducer will receive a degraded signal or no signal at all at the expected time. Similarly, the depression will cause a reflection of the ultrasonic waves back to the sending transducer. By measuring the time of flight of the ultrasound to the depression and back, the location on the tube where the depression occurs can be determined. During the next half cycle, the other transducer will attempt to send ultrasound to the first transducer. Once again, if there is a partial depression, a reduced signal will be received at the second transducer and if the tube 260 is collapsed, then no sound will be heard by the second transducer. With this rather simple structure, the fact that a small depression takes place anywhere in the tube labyrinth can be detected sufficiently to activate the heads up display. Then, when the operator has chosen a function to be performed and depressed the cover of the touch pad sufficiently to substantially or completely close one or more tubes, indicating a selection of a particular service, the service may be performed as described in more detail above. This particular implementation of the invention does not readily provide for control of a cursor on the heads up display. For this implementation, therefore, only the simpler heads up display's involving a selection of different switching functions can be readily performed.

In FIGS. 8 and 8A, a force sensitive touch pad is illustrated generally at 200 and comprises a relatively rigid plate which has been pre-scored at 301 so that it opens easily when the airbag is deployed. Load or force sensing pads 310 are provided at the four corners of the touch pad 200 (FIG. 8A). Pressing on the touch pad 200 causes a force to be exerted on the four load sensing pads 310 and by comparing the magnitudes of the force, the position and force of a finger on the touch pad 200 can be determined as taught in U.S. Pat. No. 5,673,066.

In FIG. 9, a thin capacitive mounted touch pad is illustrated and is similar to the touch pad described in FIG. 3A of U.S. Pat. No. 5,565,658. Once again, steering wheel 103 contains the touch pad assembly 200. The touch pad assembly 200 comprises a ground conductor 276, a first insulating area 275, which can be in the form of a thin coating of paint or ink, a first conducting layer or member 274, which can be a screen printed conducting ink, a second insulating area of 273 which also can be in the form of a paint or ink and a second conducting layer or member 272, which again can be a screen printed ink. The two conducting layers 272, 274 are actually strips of conducting material and are placed orthogonal to each other. Finally, there is an insulating overlay 271 which forms the cover of the touch pad assembly 200. Although the assembly 200 is very thin, typically measuring less than about 0.1 inches thick, one area of the assembly at 277 is devoid of all of the layers except the conductive layer 274. In this manner, when the airbag (mounted under the tough pad 200) deploys, the assembly 200 will easily split (at 277) permitting the airbag cover to open and the airbag to be deployed. The operation of capacitive touch pads of this type is adequately described in the above referenced patent and will not be repeated here.

Figure 10:
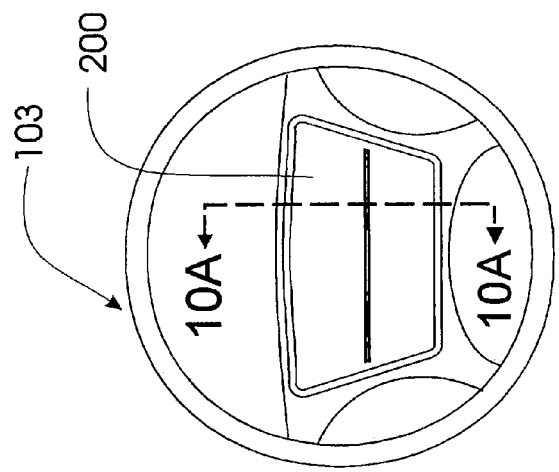
FIG. 10 is a front view of a resistance touch pad arranged in connection with a steering wheel.
Figure 10A:
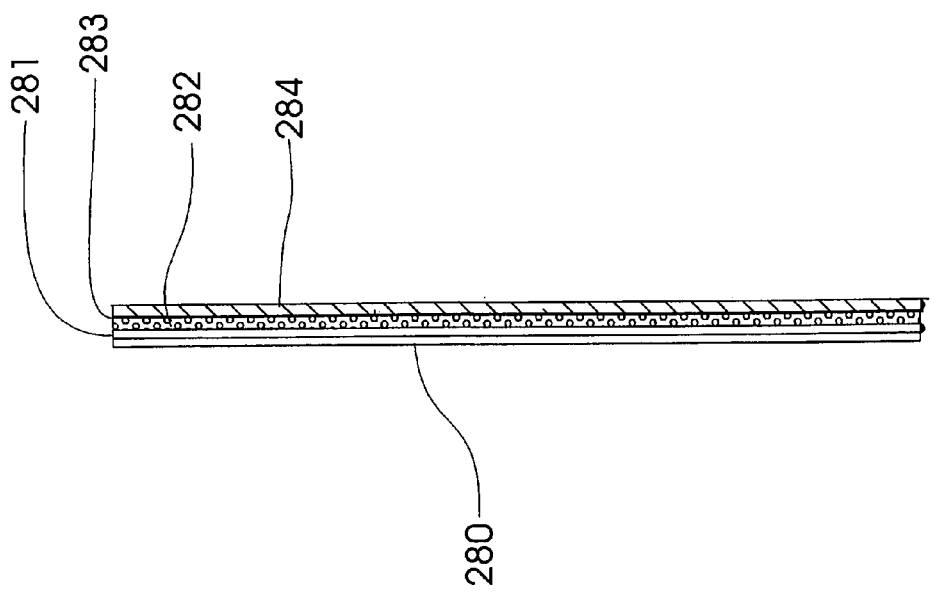
FIG. 10A is a cross sectional view of the steering wheel shown in FIG. 10 taken along the line 10A–10A of FIG. 10.
Figure 12:
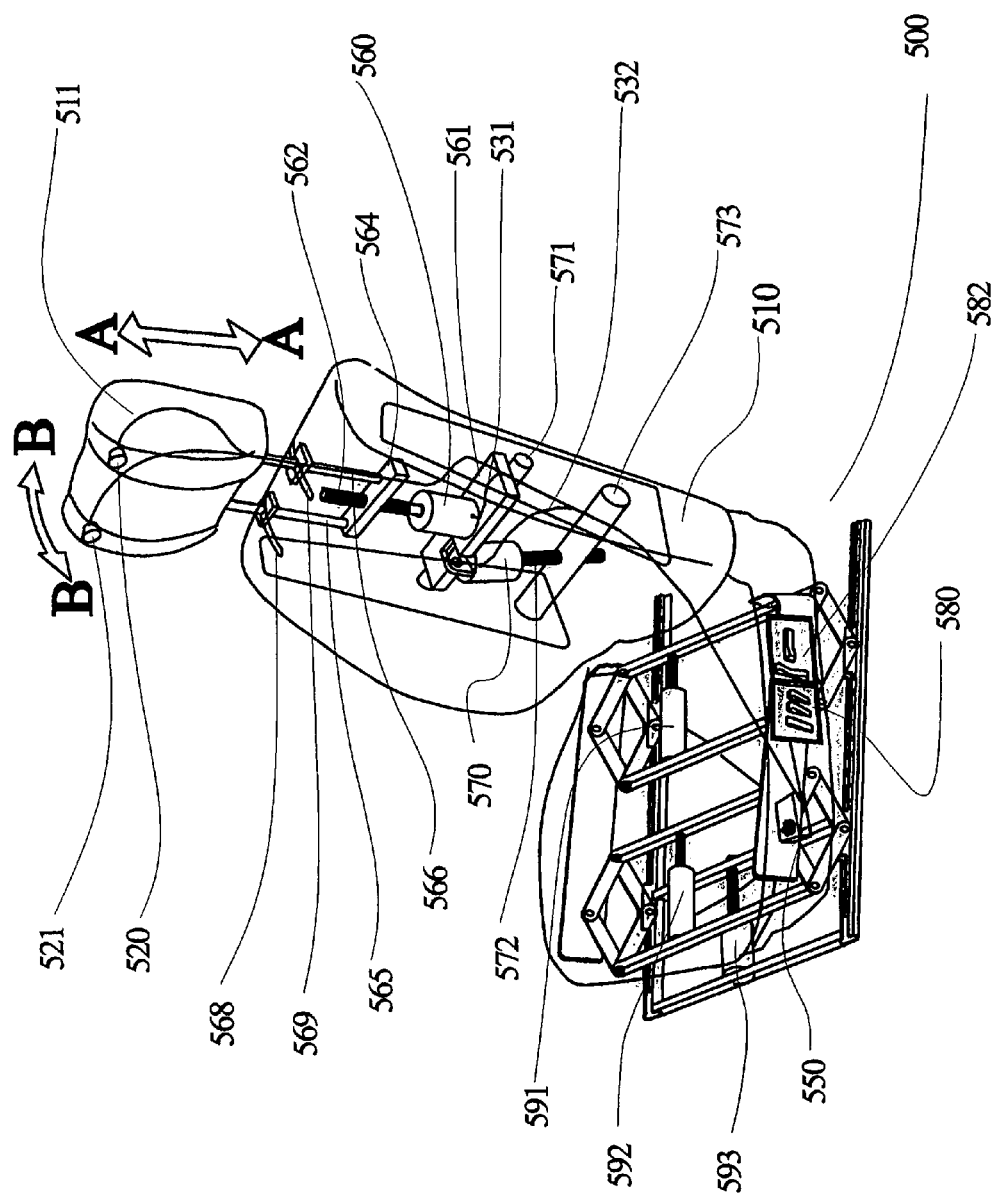
FIG. 12 is a perspective view of an automatic seat adjustment system, with the seat shown in phantom, with a movable headrest and sensors for measuring the height of the occupant from the vehicle seat showing motors for moving the seat and a control circuit connected to the sensors and motors.

FIGS. 10 and 10A show an alternate touch pad design similar to FIG. 12 of U.S. Pat. No. 4,198,539. This touch pad design 200 comprises an insulating area 280, a conductive area 281, a semi-conductive or pressure sensitive resistive layer 282, a thin conducting foil 283 and an insulating cover 284, which forms the cover of the airbag assembly. The operation of touch pads of this type is disclosed in detail in the above referenced patent and will not be repeated here.

The interior of a passenger vehicle is shown generally at 600 in FIGS. 11A and 11B. These figures illustrate two of the many alternate positions for touch pads, in this case for the convenience of the passenger. One touch pad 610 is shown mounted on the armrest within easy reach of the right hand of the passenger (FIG. 11A). The second installation 620 is shown projected out from the instrument panel 625. When not in use, this assembly can be stowed in the instrument panel 625 out of sight. When the passenger intends on using the touch pad 620, he or she will pull the touch pad assembly 620 by handle 640 bringing the touch pad 620 toward him or her. For prolonged use of the touch pad 620, the passenger can remove the touch pad 620 from the cradle and even stow the cradle back into the instrument panel 625. The touch pad 620 can then be operated from the lap of the passenger. In this case, the communication of the touch pad 620 to the vehicle is done by either infrared or radio frequency transmission or by some other convenient wireless method or with wires.

Referring now to FIG. 12, an automatic seat adjustment system is shown generally at 500 with a movable headrest 511 and ultrasonic sensor 520 and ultrasonic receiver 521 for measuring the height of the occupant of the seat as taught in U.S. Pat. No. 5,822,707, which is included herein by reference. Motors 591, 592, and 593 connected to the seat for moving the seat, a control circuit or module 550 connected to the motors and a headrest actuation mechanism using motors 560 and 570, which may be servo-motors, are also illustrated. The seat 510 and headrest 511 are shown in phantom. Vertical motion of the headrest 511 is accomplished when a signal is sent from control module 550 to servo motor 560 through a wire 531. Servo motor 560 rotates lead screw 562 which engages with a threaded hole in member 564 causing it to move up or down depending on the direction of rotation of the lead screw 562. Headrest support rods 565 and 566 are attached to member 564 and cause the headrest 511 to translate up or down with member 564. In this manner, the vertical position of the headrest can be controlled as depicted by arrow A—A.

Wire 532 leads from control module 550 to servo motor 570 which rotates lead screw 572. Lead screw 572 engages with a threaded hole in shaft 573 which is attached to supporting structures within the seat shown in phantom. The rotation of lead screw 572 rotates servo motor support 561, upon which servo-motor 560 is situated, which in turn rotates headrest support rods 565 and 566 in slots 568 and 569 in the seat 510. Rotation of the servo motor support 561 is facilitated by a rod 571 upon which the servo motor support 561 is positioned. In this manner, the headrest 511 is caused to move in the fore and aft direction as depicted by arrow B—B. Naturally, there are other designs which accomplish the same effect in moving the headrest up and down and fore and aft.

The operation of the system is as follows. When an occupant is seated on a seat containing the headrest and control system described above, the ultrasonic transmitter 520 emits ultrasonic energy which reflects off of the head of the occupant and is received by receiver 521. An electronic circuit in control module 550 contains a microprocessor which determines the distance from the head of the occupant based on the time between the transmission and reception of an ultrasonic pulse. The headrest 511 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 510, the headrest 511 moves to find the top of the occupant's head as discussed above. This is accomplished using an algorithm and a microprocessor which is part of control circuit 550. The headrest 511 then moves to the optimum location for rear impact protection as described in U.S. Pat. No. 5,694,320, which is included herein by reference. Once the height of the occupant has been measured, another algorithm in the microprocessor in control circuit 550 compares the occupant's measured height with a table representing the population as a whole and from this table, the appropriate positions for the seat corresponding to the occupant's height is selected. For example, if the occupant measured 33 inches from the top of the seat bottom, this might correspond to a 85% human, depending on the particular seat and statistical tables of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, as well as a good view of the HUD.

Once the proper position has been determined by control circuit 550, signals are sent to motors 591, 592, and 593 to move the seat to that position. The seat 510 also contains two control switch assemblies 580 and 582 for manually controlling the position of the seat 510 and headrest 511. The seat control switches 580 permit the occupant to adjust the position of the seat if he or she is dissatisfied with the position selected by the algorithm.

U.S. Pat. No. 5,329,272 mentions that by the methods and apparatus thereof, the size of the driver's binocular or eye box is 13 cm horizontal by 7 cm vertical. However, the chances of the eyes of the driver being in such an area are small, therefore, for proper viewing either the driver will need to be moved or the heads up display adjusted.

Figure 13:
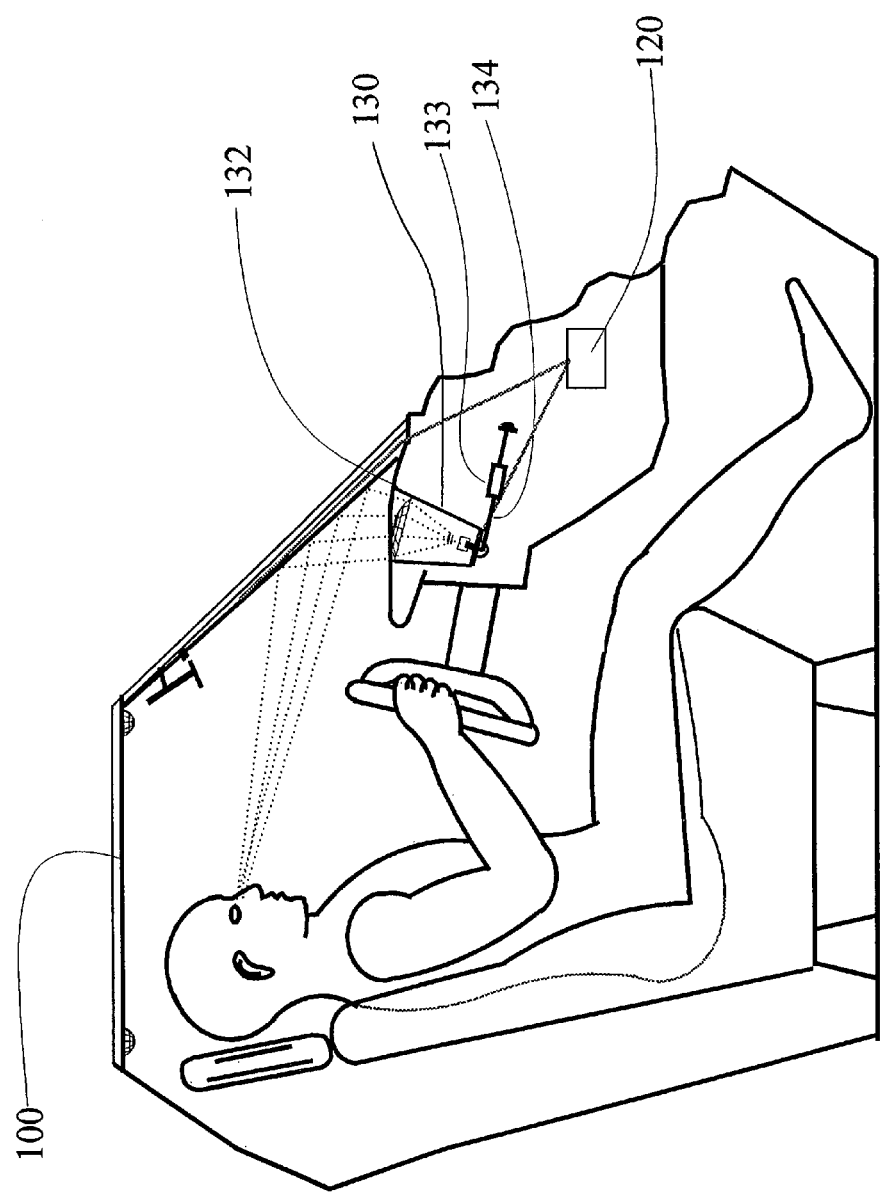
FIG. 13 illustrates how the adjustment of heads up display can be done automatically.

As an alternative to adjusting the seat to properly positioned the eyes of the driver or passenger with respect to the heads up display, the heads up display itself can be adjusted as shown in FIG. 13. The heads up display assembly 130 is adapted to rotate about its attachment to an upper surface of the instrument panel 132 through any of a variety of hinging or pivoting mechanisms. The bottom of the heads up display assembly 130 is attached to an actuator 133 by means of activating rod 134 and an appropriate attachment fastener. Control module 120, in addition to controlling the content of the heads up display, also contains circuitry which adjusts the angle of the projection assembly 130 based on the determined location of the occupant's eyes. Other means for enabling displacement of the heads up display assembly 130 are also within the scope of the invention.

There are many cases in a vehicle where it is desirable to have a sensor capable of receiving an information signal from a particular signal source where the environment includes sources of interference signals at locations different from that of the signal source. The view through a HUD is one example and another is use of a microphone for hands free telephoning or to issue commands to various vehicle systems.

If the exact characteristics of the interference are known, then a fixed-weight filter can be used to suppress it. Such characteristics are usually not known since they may vary according to changes in the interference sources, the background noise, acoustic environment, orientation of the microphone with respect to the driver's mouth, the transmission paths from the signal source to the microphone, and many other factors. Therefore, in order to suppress such interference, an adaptive system that can change its own parameters in response to a changing environment is needed.

The concept of an adaptive filter is discussed in great detail in U.S. Pat. No. 5,825,898, which is included herein by reference.

The use of adaptive filters for reducing interference in a received signal, as taught in the prior art, is known as adaptive noise canceling. It is accomplished by sampling the noise independently of the source signal and modifying the sampled noise to approximate the noise component in the received signal using an adaptive filter. For an important discussion on adaptive noise canceling, see B. Widrow et al., Adaptive Noise Canceling: Principles and Applications, Proc. IEEE 63:1692–1716, 1975, included herein by reference.

In a typical configuration, a primary input is received by a microphone directed to a desired signal source and a reference input is received independently by another microphone directed in a different direction. The primary signal contains both a source component and a noise component.

The independent microphone, due to its angular orientation, is less sensitive to the source signal. The noise components in both microphones are correlated and of similar magnitude since both originate from the same noise source. Thus, a filter can be used to filter the reference input to generate a canceling signal approximating the noise component. The adaptive filter does this dynamically by generating an output signal that is the difference between the primary input and the canceling signal, and by adjusting its filter weights to minimize the mean-square value of the output signal. When the filter weights converge, the output signal effectively replicates the source signal substantially free of the noise component.

What is presented here, as part of this invention, is an alternative but similar approach to the adaptive filter that is particularly applicable to vehicles such as automobiles and trucks. The preferred approach taken here will be to locate the mouth of the driver and physically aim the directional microphone toward the driver's mouth. Alternately, a multi-microphone technique known in the literature as "beam-forming", which is related to phase array theory, can be used. Since the amount of motion required by the microphone is in general small, and for some vehicle applications it can be eliminated altogether, this is the preferred approach. The beam-forming microphone array can effectively be pointed in many directions without it being physically moved and thus it may have applicability for some implementations.

The sources of the background noise in an automobile environment are known and invariant over short time periods. For example wind blowing by the edge of the windshield at high speed is known to cause substantial noise within most vehicles. This noise is quite directional and varies significantly depending on vehicle speed. Therefore the noise cancellation systems of U.S. Pat. No. 5,673,325 cannot be used in its simplest form but the adaptive filter with varying coefficients that take into account the directivity of sound can be used, as described in U.S. Pat. No. 5,825,898. That is, a microphone placed on an angle may hear a substantially different background noise then the primary microphone because of the directionality of the sources of the noise. When the speaker is not speaking and the vehicle is traveling at a constant velocity, these coefficients perhaps can be determined. Therefore, one approach is to characterize the speech of the speaker so that it is known when he or she is speaking or not. Since most of the time he or she will not speaking, most of the time the correlation coefficients for an adaptive filter can be formed and the noise can be substantially eliminated.

If two or more microphones have different directional responses, then the direction of sound can be determined by comparing the signals from the different microphones. Therefore, it is theoretically possible to eliminate all sound except that from a particular direction. If six microphones are used on the six faces of a cube, it is theoretically possible to eliminate all sound except that which is coming from a particular direction. This can now be accomplished in a very small package using modern silicon microphones.

An alternate approach, and the preferred approach herein, is to use two microphones that are in line and separated by a known amount such as about 6 inches. This is similar to but simpler than the approach described in U.S. Pat. No. 5,715,319.

U.S. Pat. No. 5,715,319 describes a directional microphone array including a primary microphone and two or more secondary microphones arranged in line and spaced predetermined distances from the primary microphone. Two or more secondary microphones are each frequency filtered with the response of each secondary microphone limited to a predetermined band of frequencies. The frequency filtered secondary microphone outputs are combined and inputted into a second analog to digital converter. Further aspects of this invention involve the use of a ring of primary microphones which are used to steer the directionality of the microphones system toward a desired source of sound. This patent is primarily concerned with developing a steerable array of microphones that allow electronics to determine the direction of the preferred signal source and then to aim the microphones in that general direction. The microphone signals in this patent are linearly combined together with complex weights chosen to maximize the signal to noise ratio.

In contrast to U.S. Pat. No. 5,715,319, the microphone of the present invention merely subtracts all signals received by both the first and the second microphones which are not at the precise calculated phase indicating that the sound is coming from a different direction, rather than a direction in line with the microphones. Although in both cases the microphones are placed on an axis, the method of processing the information is fundamentally different as described in more detail below.

If it is known that the microphone assembly is pointing at the desired source, then both microphones will receive the same signals with a slight delay. This delay will introduce a known phase shift at each frequency. All signals that do not have the expected phase shift can then be eliminated resulting in the canceling of all sound that does not come from the direction of the speaker.

For the purposes of telephoning and voice recognition commands, the range of frequencies considered can be reduced to approximately 800 Hz to 2000 Hz. This further serves to eliminate much of the noise created by the sound of tires on the road and wind noise that occurs mainly at lower and higher frequencies. If further noise reduction is desired a stochastic approach based on a sampling of the noise when the occupant is not talking can be effective.

By looking at the phases of each of the frequencies, the direction of the sound at that frequency can be determined. The signals can then be processed to eliminate all sound that is not at the exact proper phase relationship indicating that it comes from the desired particular direction. With such a microphone arrangement, it does not in general require more than two microphones to determine the radial direction of the sound source.

Figure 14:
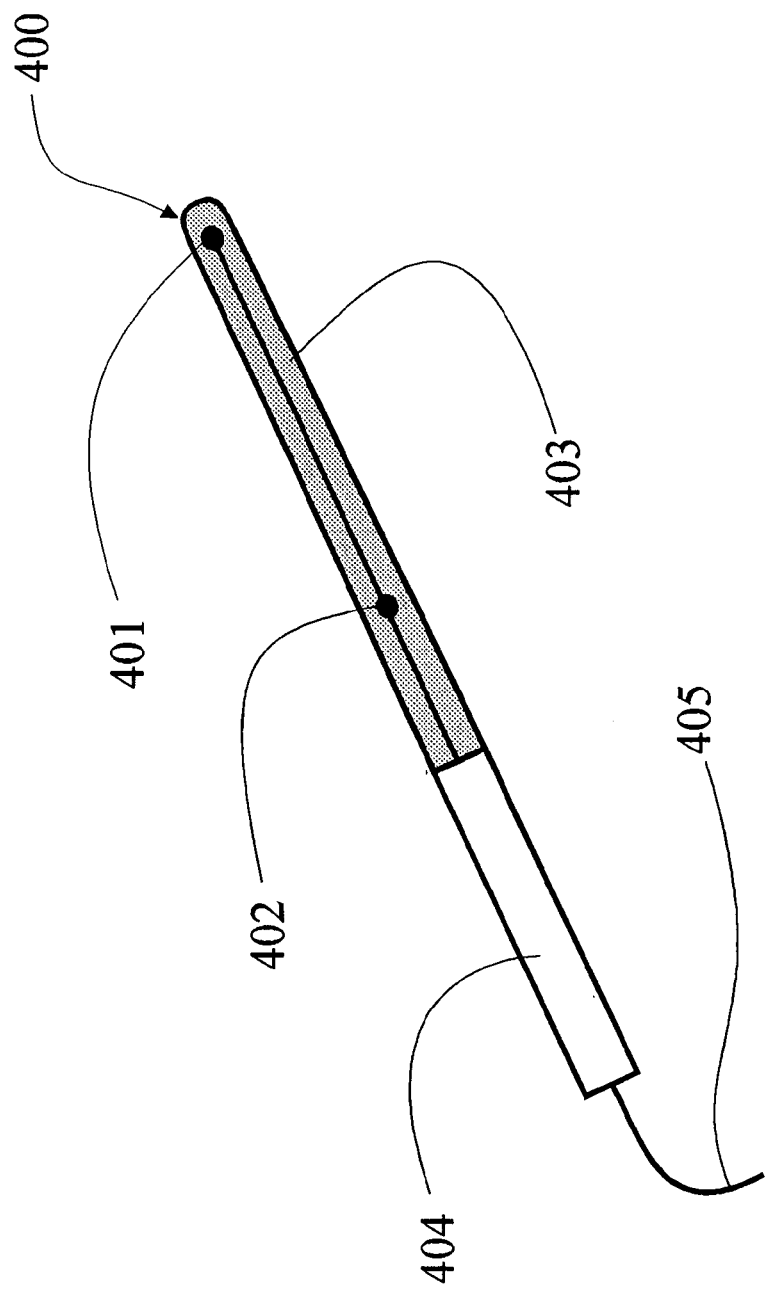
FIG. 14 is a view of a directional microphone.

A directional microphone constructed in accordance with this invention is shown generally at 400 in FIG. 14. Two microphones 401 and 402 are displaced an appropriate distance apart which can vary from 0.5 to 9 inches depending on the application and the space available, with a preferred spacing of about 3 inches. The two microphones 401, 402 are surrounded by acoustic transparent foam 403 and the assembly is held by a holder 404. Wire 405 connects the microphones to the appropriate electronic circuitry.

Many changes, modifications, variations and other uses and applications of the subject invention will become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The preferred embodiments of the invention are described above and unless specifically noted, it is the applicant's intention that the words and phrases in the specification and claims be given the ordinary and accustomed meaning to those of ordinary skill in the applicable art(s). If applicant intends any other meaning, they will specifically state they are applying a special meaning to a word or phrase.

Likewise, applicant's use of the word "function" herein is not intended to indicate that the applicant seeks to invoke the special provisions of 35 U.S.C. §112, sixth paragraph, to define their invention. To the contrary, if applicant wishes to invoke the provisions of 35 U.S.C.§112, sixth paragraph, to define their invention, they will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define their invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

What is claimed is:

1. A vehicle including an interactive display system for a vehicle, comprising:
   forming means for forming an image of text and/or graphics in a field of view of a forward-facing occupant of the vehicle,
   interacting means coupled to said forming means for enabling the occupant to interact with said forming means to direct another vehicular system to perform an operation, said interacting means comprising a touch pad arranged to enable the occupant to interact with said forming means to direct the another vehicular system to perform a operation, said forming means being arranged to form the image apart from said touch pad, and
   correlation means for correlating a location on said touch pad which has been touched by the occupant to the image to enable the occupant to change the image formed by said forming means or direct the another vehicular system to perform an operation by touching said touch pad, said correlation means being coupled to said forming means and arranged to cause said forming means to display an indicator in the image which correlates to the location on said touch pad touched by the occupant.

2. The vehicle of claim 1, wherein said forming means comprise a heads-up display.

3. The vehicle of claim 1, wherein said forming means are arranged in connection with an instrument panel of the vehicle.

4. The vehicle of claim 1, wherein said forming means are arranged to form the image on a windshield of the vehicle.

5. The vehicle of claim 1, wherein said forming means comprise two heads up displays, one arranged to project text and/or graphics into a field of view of a driver and the other arranged to project text and/or graphics into a field of view of the passenger.

6. The vehicle of claim 1, wherein said interacting means further comprise a microphone.

7. The vehicle of claim 1, further comprising a steering wheel said touch pad being arranged on said steering wheel of the vehicle.

8. The vehicle of claim 7, further comprising an airbag module having a cover and being arranged in said steering wheel, said touch pad being arranged over said cover of said airbag module.

9. The vehicle of claim 8, wherein said touch pad is constructed to break upon deployment of said airbag from said airbag module.

10. The vehicle of claim 1 wherein said correlation means are arranged such that contact with said touch pad causes said forming means to change the image based on the location on said touch pad which has been touched by the occupant.

11. The vehicle of claim 1, wherein said correlation means are arranged such that contact with said touch pad causes the vehicular system to perform the operation based on the location on said touch pad which has been touched by the occupant.

12. The vehicle of claim 1, wherein said touch pad is separable from the vehicle.

13. The vehicle of claim 1, wherein said touch pad and said forming means include means for enabling wireless communication between said touch pad and said forming means.

14. The vehicle of claim 1, wherein said touch pad is arranged in an armrest of the vehicle.

15. The vehicle of claim 1, wherein said touch pad is arranged in connection with an instrument panel of the vehicle and is movable between a storage position in which said touch pad is inaccessible to the occupant and a use position in which said touch pad is accessible to the occupant.

16. The vehicle of claim 1, wherein said touch pad is arranged to enable the occupant to interact with said forming means to change the image formed by said forming means.

17. The vehicle of claim 1, wherein the another vehicular system is a heating and air-conditioning system.

18. The vehicle of claim 1, wherein said forming means comprise a holographic combiner arranged in connection with a windshield of the vehicle.

19. The vehicle of claim 1, further comprising
   determining means for determining a desired location of the eyes of the occupant, and
   adjustment means coupled to said forming means for adjusting said forming means based on the determined desired location of the eyes of the occupant and thus the location of the image and thereby enable the occupant's view of the image to be improved.

20. The vehicle of claim 19, wherein said determining means comprise at least one receiver for receiving waves from a space above a seat in the vehicle in which the occupant is likely to be situated.

21. The vehicle of claim 20, wherein said determining means further comprise pattern recognition means for determining the position of the occupant based on the waves received by said at least one receiver and enable the desired position of the eyes of the occupant to be determined from the position of the occupant.

22. The vehicle of claim 19, wherein said determining means comprise at least one transmitter for transmitting waves into the space above a seat in the vehicle and at least one receiver for receiving the transmitted waves after the waves have passed at least partially through the space above the seat.

23. A vehicle including a display system for a vehicle, comprising
forming means for forming an image of text and/or graphics in a field of view of a forward-facing occupant of the vehicle,
a touch pad coupled to said forming means for enabling the occupant to interact with said forming means to change the image formed by said forming means or direct another vehicular system to perform an operation,
correlation means for correlating a location on said touch pad which has been touched by the occupant to the image to enable the occupant to direct the another vehicular system to perform an operation by touching said touch pad, said correlation means being coupled to said forming means and arranged to cause said forming means to display an indicator in the image which correlates to The location on said touch pad touched by the occupant, said touch pad being arranged to enable the occupant to interact with said forming means to direct another vehicular system to perform an operation,
determining means for determining a desired location of the eyes of the occupant for optimum viewing of the image, and
adjustment means coupled to said forming means for adjusting said forming means based on the determined desired location of the eyes of the occupant and thus the location of the image and thereby enable the occupant's view of the image to be improved.

24. The vehicle of claim 23, further comprising a steering wheel, said touch pad being arranged on said steering wheel of the vehicle.

25. The vehicle of claim 23, further comprising an airbag module having a cover and being arranged in said steering wheel, said touch pad being arranged over said cover of said airbag module and is constructed to break upon deployment of an airbag from the airbag module.

26. The vehicle of claim 23, wherein said correlation means are arranged such that contact with said touch pad causes said forming means to change the image based on the location on said touch pad which has been touched by the occupant.

27. The vehicle of claim 23, wherein said correlation means are arranged such that contact with said touch pad causes the vehicular system to perform the operation based on the location on said touch pad which has been touched by the occupant.

28. The vehicle of claim 23, wherein said touch pad is separable from the vehicle.

29. The vehicle of claim 23, wherein said touch pad and said forming means include means for enabling wireless communication between said touch pad and said forming means.

30. The vehicle of claim 23, wherein said touch pad is arranged in an armrest of the vehicle.

31. The vehicle of claim 23, wherein said touch pad is arranged in connection with an instrument panel of the vehicle and is movable between a storage position in which said touch pad is inaccessible to the occupant and a use position In which said touch pad is accessible to the occupant.

32. The vehicle of claim 23, wherein said touch pad is arranged to enable the occupant to interact with said forming means to change the image formed by said forming means.

33. The vehicle of claim 23, wherein determining means comprise at least one receiver for receiving waves from a space above a seat in the vehicle in which the occupant is likely to be situated.

34. The vehicle of claim 33, wherein said determining means further comprise pattern recognition means for determining the position of the occupant based on the waves received by said at least one receiver and enable the desired position of the eyes of the occupant to be determined from the position of the occupant.

35. The vehicle of claim 23, wherein said determining means comprise at least one transmitter for transmitting waves into the space above a seat in the vehicle and at least one receiver for receiving the transmitted waves after the waves have passed at least partially through the space above the seat.

36. A vehicle including an interactive display system for a vehicle, comprising:
forming means for forming an image of text and/or graphics in a field of view of a forward-facing occupant of the vehicle, said forming means comprising two heads up displays, one arranged to project tent and/or graphics into a field of view of a driver of the vehicle and the other arranged to project text and/or graphics into a field of view of a passenger of the vehicle, and
interacting means coupled to said forming means for enabling the occupant to interact with said forming means to change the image formed by said forming means or direct another vehicular system to perform an operation, said interacting means comprising a touch pad,
said forming means being arranged to form the image apart from said touch pad,
wherein a location on said touch pad which has been touched by the occupant is correlated to the image to enable the occupant to change the image formed by said forming means or direct the another vehicular system to perform an operation by touching said touch pad.

37. The vehicle of claim 36, wherein said forming means are aged in connection with an instrument panel of the vehicle.

38. The vehicle of claim 36, wherein said forming means are arranged to form the image on a windshield of the vehicle.

39. The vehicle of claim 36, wherein said interacting means further comprise a microphone.

40. The vehicle of claim 36, further comprising a steering wheel, said touch pad being arranged on said steering wheel of the vehicle.

41. The vehicle of claim 40, further comprising an airbag module having a cover and being arranged in said steering wheel, said touch pad being arranged over said cover of said airbag module.

42. The vehicle of claim 41, wherein said touch pad is constructed to break upon deployment of said airbag from said airbag module.

43. The vehicle of claim 36, further comprising correlation means for correlating a location on said touch pad which has been touched by the occupant to the image and arranged such that contact with said touch pad causes said forming means to change the image based on the location on said touch pad which has been touched by the occupant.

44. The vehicle of claim 36, further comprising correlation means for correlating a location on said touch pad which has been touched by the occupant to the image and arranged such that contact with said touch pad causes the vehicular system to perform the operation based on the location on said touch pad which has been touched by the occupant.

45. The vehicle of claim 36, wherein said touch pad is separable from the vehicle.

46. The vehicle of claim 36, wherein said touch pad and said forming means include means for enabling wireless communication between said touch pad and said forming means.

47. The vehicle of claim 36, wherein said touch pad is arranged in an armrest of the vehicle.

48. The vehicle of claim 36, wherein said touch pad is arranged in connection with an instrument panel of the vehicle and is movable between a storage position in which said touch pad is inaccessible to the occupant and a use position in which said touch pad is accessible to the occupant.

49. The vehicle of claim 36, wherein said touch pad is arranged to enable the occupant to interact with said forming means to change the image formed by said forming means.

50. The vehicle of claim 36, wherein said touch pad is arranged to enable the occupant to interact with said forming means to direct another vehicular system to perform an operation.

51. The vehicle of claim 50, wherein the another vehicular system is a heating and air-conditioning system.

52. The vehicle of claim 36, wherein said forming means comprise a holographic combiner arranged in connection with a windshield of the vehicle.

53. The vehicle of claim 36, further comprising determining means for determining a desired location of the eyes of the occupant, and adjustment means coupled to said forming means for adjusting said forming means based on the determined desired location of the eyes of the occupant and thus the location of the image and thereby enable the occupant's view of the image to be improved.

54. The vehicle of claim 53, wherein said determining means comprise at least one receiver for receiving waves from a space above a seat in the vehicle in which the occupant is likely to be situated.

55. The vehicle of claim 54, wherein said determining means further comprise pattern recognition means for determining the position of the occupant based on the waves received by said at least one receiver and enable the desired position of the eyes of the occupant to be determined from the position of the occupant.

56. The vehicle of claim 53, wherein said determining means comprise at least one transmitter for transmitting waves into the space above a seat in the vehicle and at least one receiver for receiving the transmitted waves after the waves have passed at least partially through the space above the seat.

57. The vehicle of claim 36, further comprising correlation means for correlating a location on said touch pad which has been touched by the occupant to the image to enable the occupant to change the image formed by said forming means or direct the another vehicular system to perform an operation by touching said touch pad, said correlation means being coupled to said forming means and arranged to cause said forming means to display an indicator in the image which correlates to the location on said touch pad touched by the occupant.

58. The vehicle of claim 36, wherein said forming means are controlled to display an indicator in the image which correlates to the location on said touch pad touched by the occupant.

* * * * *

UNITED STATES PATENT AND TRADEMARK OFFICE
CERTIFICATE OF CORRECTION

| | |
|---|---|
| PATENT NO. | : 7,126,583 B1 |
| APPLICATION NO. | : 09/645709 |
| DATED | : October 24, 2006 |
| INVENTOR(S) | : David S. Breed |

It is certified that error appears in the above-identified patent and that said Letters Patent is hereby corrected as shown below:

Col. 33, line 58, change "a" to --an--.

Col. 35, line 34, change "The" to --the--.

Col. 36, line 11, change "In" to --in--.

Col. 36, line 38, change "tent" to --text--.

Col. 36, line 58, change "aged" to --arranged--.

Signed and Sealed this

Second Day of January, 2007

JON W. DUDAS
*Director of the United States Patent and Trademark Office*